United States Patent
Butcher et al.

(10) Patent No.: US 11,726,882 B2
(45) Date of Patent: Aug. 15, 2023

(54) SYSTEM CONTROL PROCESSOR DATA MIRRORING SYSTEM

(71) Applicant: Dell Products L.P., Round Rock, TX (US)

(72) Inventors: Andrew Butcher, Cedar Park, TX (US); Shawn Joel Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 4 days.

(21) Appl. No.: 17/492,761

(22) Filed: Oct. 4, 2021

(65) Prior Publication Data
US 2023/0104784 A1    Apr. 6, 2023

(51) Int. Cl.
*G06F 16/27*    (2019.01)
*G06F 11/14*    (2006.01)

(52) U.S. Cl.
CPC .............. *G06F 11/1448* (2013.01)

(58) Field of Classification Search
CPC ...... G06F 9/4881; G06F 16/275; G06F 16/27; G06F 11/1448
See application file for complete search history.

(56) References Cited

U.S. PATENT DOCUMENTS

| | | | |
|---|---|---|---|
| 9,880,906 B2 | 1/2018 | Gold et al. | |
| 2019/0138244 A1* | 5/2019 | Singh | G06F 3/067 |
| 2019/0212797 A1* | 7/2019 | Karidis | G06F 11/1441 |
| 2020/0142995 A1* | 5/2020 | Xiang | G06F 3/067 |

* cited by examiner

*Primary Examiner* — Apu M Mofiz
*Assistant Examiner* — Cindy Nguyen
(74) *Attorney, Agent, or Firm* — Joseph Mencher

(57) ABSTRACT

An SCP data mirroring system includes a chassis housing a central processing system and an SCP subsystem. The SCP subsystem includes an SCP memory system with different priority storage queues each storing a copy of data provided by the central processing system, along with an SCP communication system and an SCP data storage subsystem. During a first time period, the SCP data storage subsystem retrieves a first copy of the data from a first storage queue in the SCP memory system and transmits it via the SCP communication system and through a network for storage on first storage device(s). During a subsequent second time period, the SCP data storage system retrieves a second copy of the data from a lower priority second storage queue in the SCP memory system and transmits it via the SCP communication system and through the network for storage on second storage device(s).

20 Claims, 20 Drawing Sheets

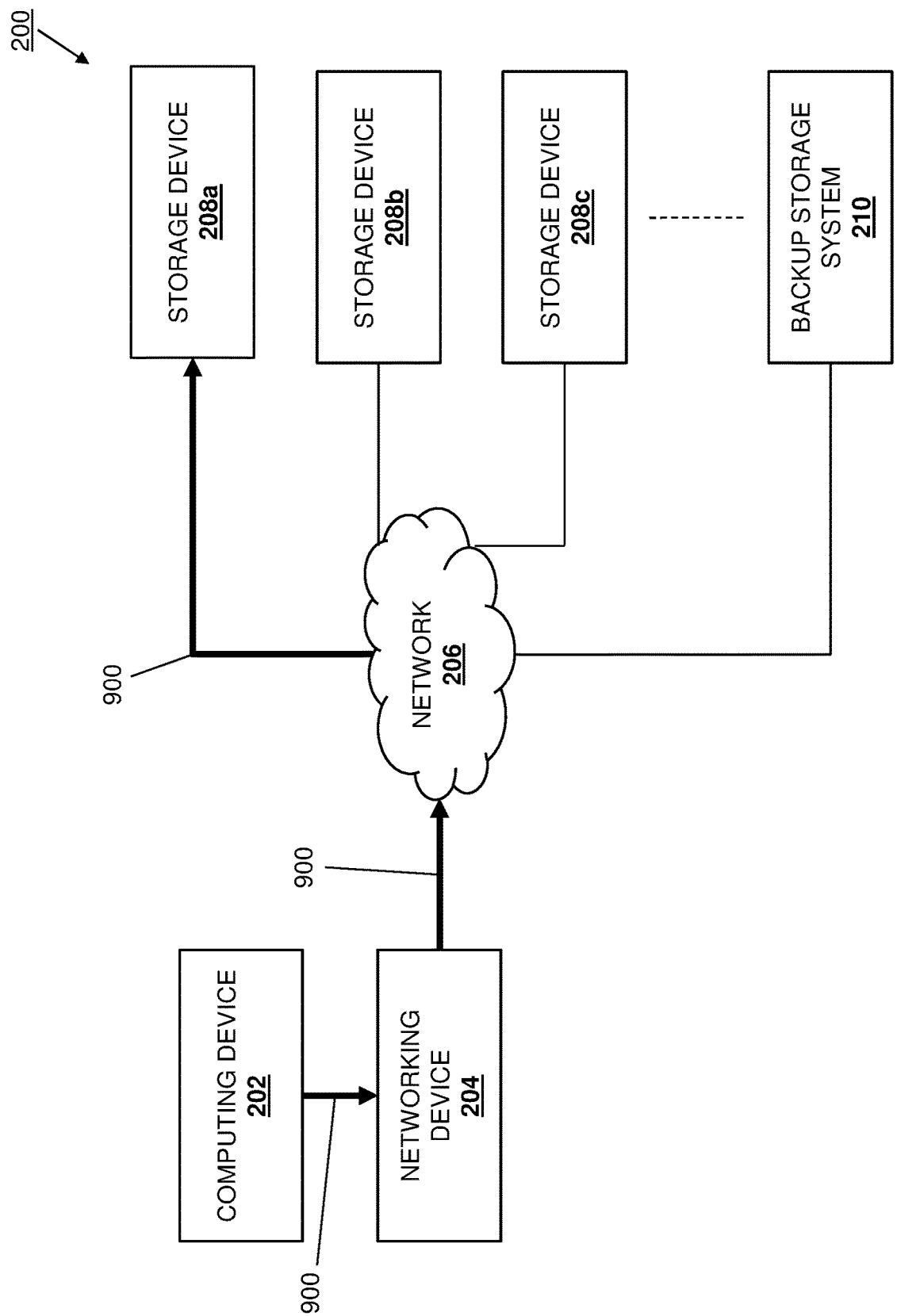

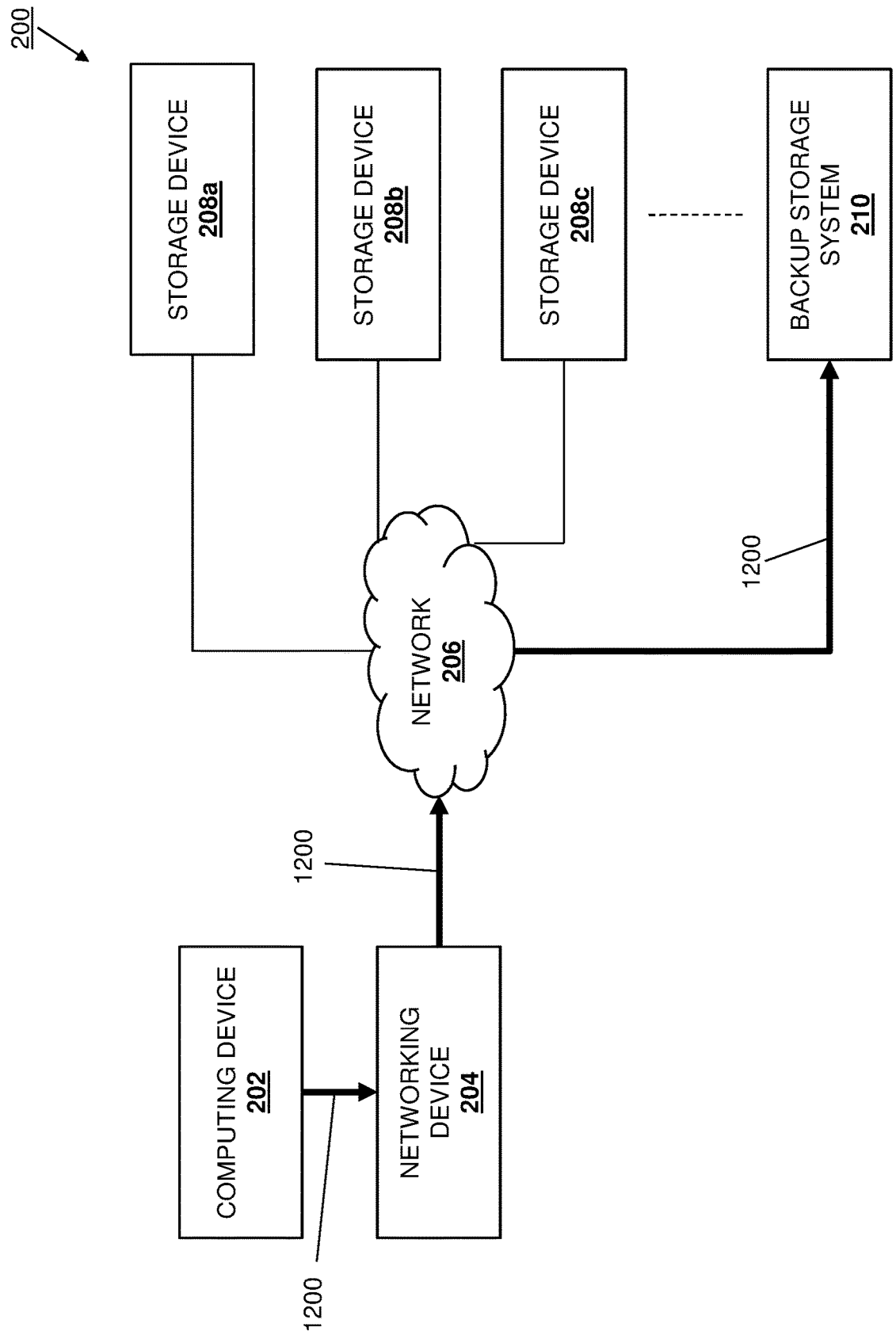

SYSTEM CONTROL PROCESSOR DATA MIRRORING SYSTEM

BACKGROUND

The present disclosure relates generally to information handling systems, and more particularly to mirroring data using a system control processor in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are often used to store data, and for "critical" data and/or other relatively important data known in the art, the ability to backup that data is often required. For example, some server devices are configured to perform data mirroring operations that include real-time storage of multiple exact copies of data generated or otherwise provided by the server device in different storage devices or locations. However, conventional data mirroring operations are performed by the Central Processing Unit (CPU) in the server device, and require intentional cycles of that CPU that can interfere and/or degrade the steady state performance of that CPU/server device.

Accordingly, it would be desirable to provide a data mirroring system that addresses the issues discussed above.

SUMMARY

According to one embodiment, an Information Handling System (IHS) includes a System Control Processor (SCP) processing system; and an SCP memory system that is coupled to the SCP processing system, that includes a plurality of different storage queues that have different priorities and that are each configured to store a copy of first data provided by a central processing system that is separate from the SCP processing system, and that includes instructions that, when executed by the SCP processing system, cause the SCP processing system to provide a SCP data storage engine that is configured to: retrieve, during a first time period, a first copy of first data stored in a first storage queue that is included in the plurality of different storage queues in the SCP memory system and that has a first priority; transmit, during the first time period, the first copy of the first data via at least one of a plurality of ports in an SCP communication system and through a network for storage on at least one first storage device; retrieve, during a second time period that is subsequent to the first time period, a second copy of the first data stored in a second storage queue that is included in the plurality of different storage queues in the SCP memory system and that has a second priority that is lower than the first priority; and transmit, during the second time period, the second copy of the first data via at least one of the plurality of ports in the SCP communication system and through the network for storage on at least one second storage device.

BRIEF DESCRIPTION OF THE DRAWINGS

FIG. 9B is a schematic view illustrating an embodiment of the networked system of FIG. 2 operating during the method of FIG. 5.

FIG. 100 is a schematic view illustrating an embodiment of the networked system of FIG. 2 operating during the method of FIG. 5.

FIG. 12B is a schematic view illustrating an embodiment of the networked system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
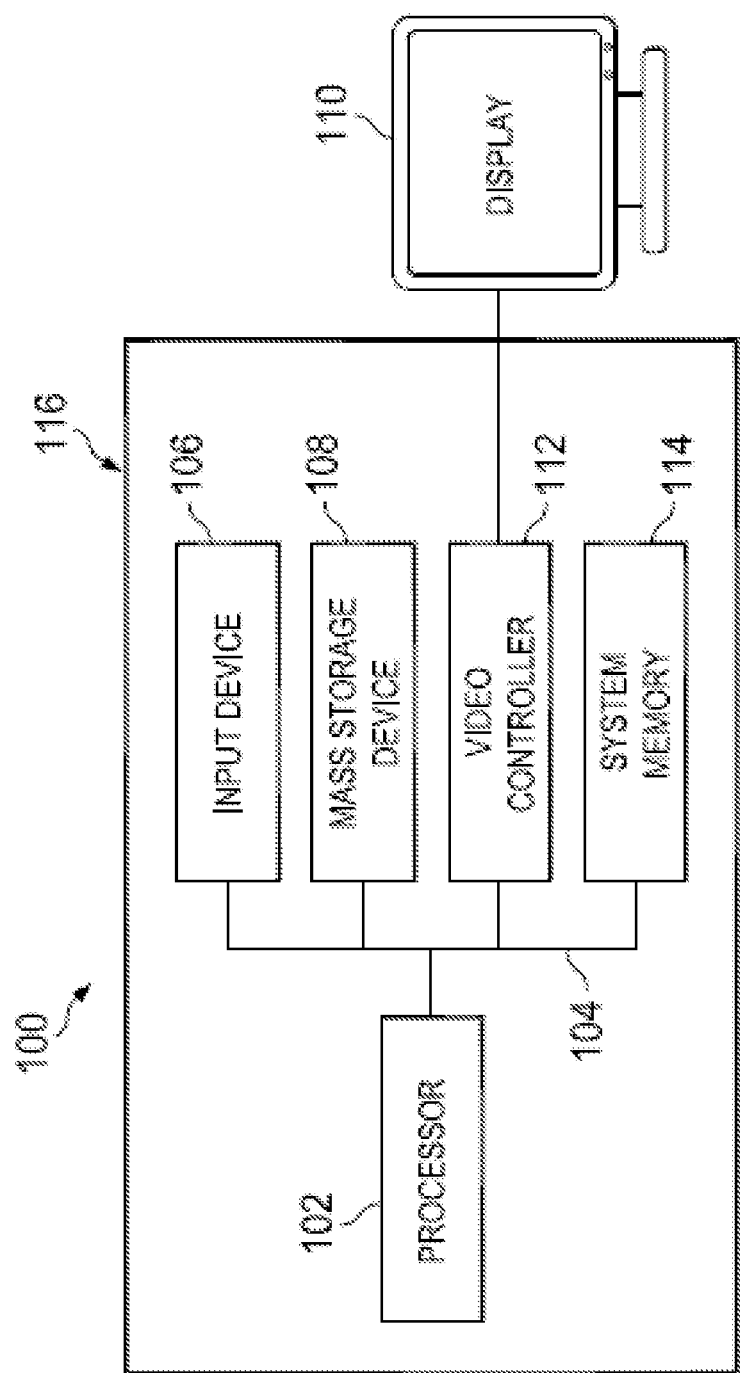
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
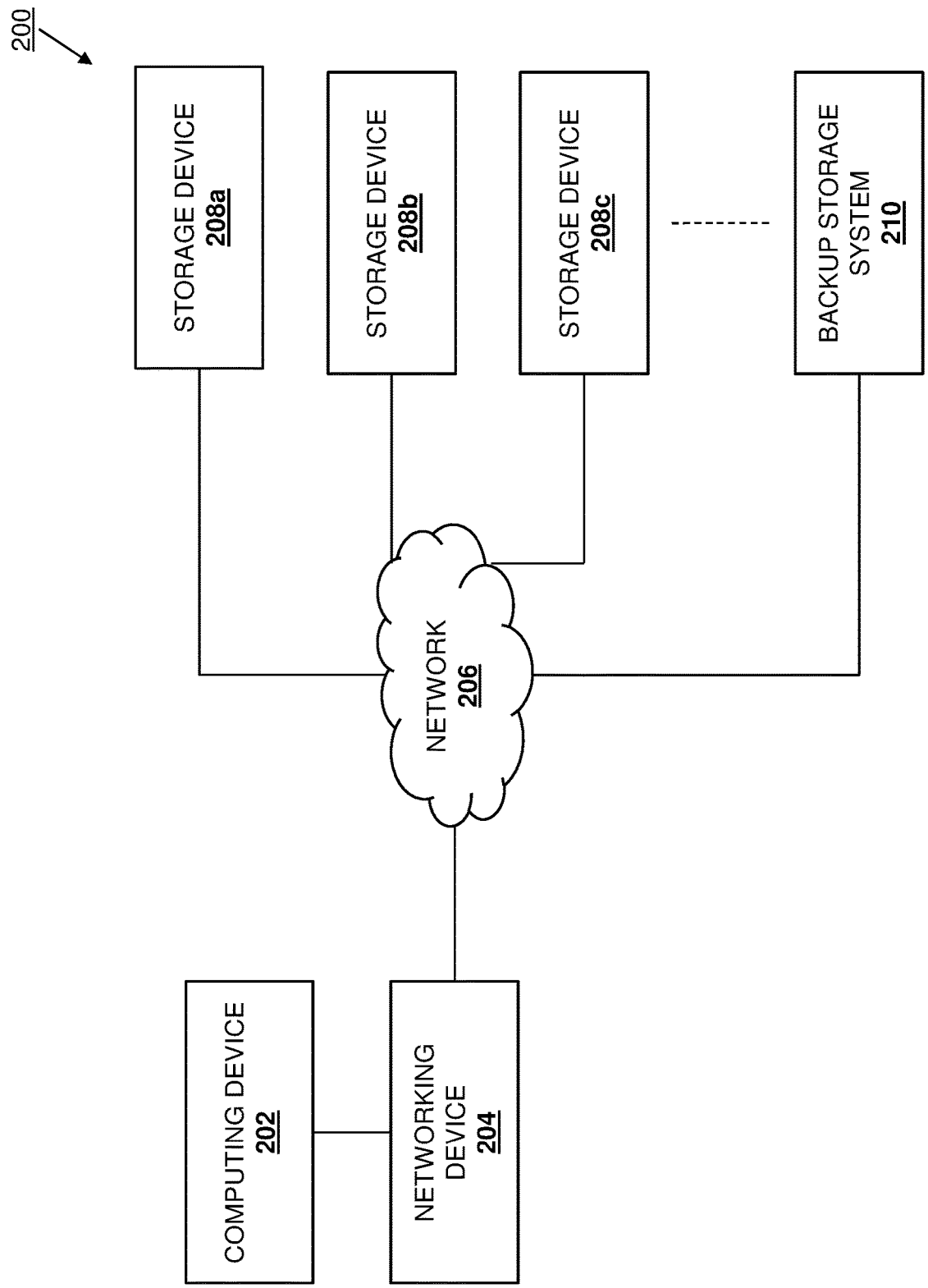
FIG. 2 is a schematic view illustrating an embodiment of a networked system that may include the system control processor data mirroring system of the present disclosure.

Referring now to FIG. 2, an embodiment of a networked system 200 is illustrated that may include the System Control Processor (SCP) data mirroring system of the present disclosure. In the illustrated embodiment, the networked system 200 includes a computing device 202. In an embodiment, the computing device 202 may be provided by the IHS 100 discussed above with reference to FIG. 1, and/or may include some or all of the components of the IHS 100, and in the specific examples below is described as being provided by a server device. However, while illustrated and discussed as being provided by a server device, one of skill in the art in possession of the present disclosure will recognize that computing devices provided in the networked system 200 may include any devices that may be configured to operate similarly as the computing device 202 discussed below. In the illustrated embodiments, the computing device 202 is coupled to a networking device 204 and that may be coupled to and/or otherwise part of a network 206 such as a Local Area Network (LAN), the Internet, combinations thereof, and/or any other networks that would be apparent to one of skill in the art in possession of the present disclosure.

In some embodiments, the networking device 204 may be provided by the IHS 100 discussed above with reference to FIG. 1, and/or may include some or all of the components of the IHS 100, and some examples may be provided by a switch device (e.g., a Top of Rack (ToR) switch device) that is configured to transmit data and power over the same data/power port and data/power cable (or multiple data/power port/cable combinations) using Power over Ethernet (PoE, PoE+, PoE++) protocols. However, while illustrated and discussed as being provided by a PoE-capable ToR switch device, one of skill in the art in possession of the present disclosure will recognize that networking devices provided in the networked system 200 may include any networking devices that may be configured to operate similarly as the networking device 202 discussed below. In the illustrated embodiments, a plurality of storage devices 208*a*, 208*b*, and up to 208*c* are coupled to the network 206, and may be provided by any of a variety of network-attached storage devices and/or storage systems that would be apparent to one of skill in the art in possession of the present disclosure. For example, the storage devices 208*a* may be included as part of a distributed storage system (e.g., a virtual Storage Area Network (vSAN) available from VMWARE® of Palo Alto, Calif., United States; a distributed storage system enabled via APACHE HADOOP open-source software, a distributed storage system enabled via POWERFLEX® available from DELL® Inc. of Round Rock, Tex., United States, etc.) for storing multiple redundant copies of data for block storage, as well as acknowledging the storage of that data.

In the illustrated embodiments, a backup storage system 210 is also coupled to the network 206, and may be provided by any of a variety of network-attached backup storage devices and/or backup storage systems that would be apparent to one of skill in the art in possession of the present disclosure. For example, the backup storage system 210 may be provided by the POWERPROTECT® DP3300 data protection appliance available from DELL®, Inc. of Round Rock, Tex., United States; the POWERPROTECT® DP4400 data protection appliance available from DELL®, Inc. of Round Rock, Tex., United States; POWERVAULT® backup and recovery media available from DELL®, Inc. of Round Rock, Tex., United States; as well as other backup storage systems that would be apparent to one of skill in the art in possession of the present disclosure. However, while a specific networked system 200 has been illustrated and described, one of skill in the art in possession of the present disclosure will recognize that the SCP data mirroring system of the present disclosure may include a variety of components and component configurations while remaining within the scope of the present disclosure as well.

Figure 3:
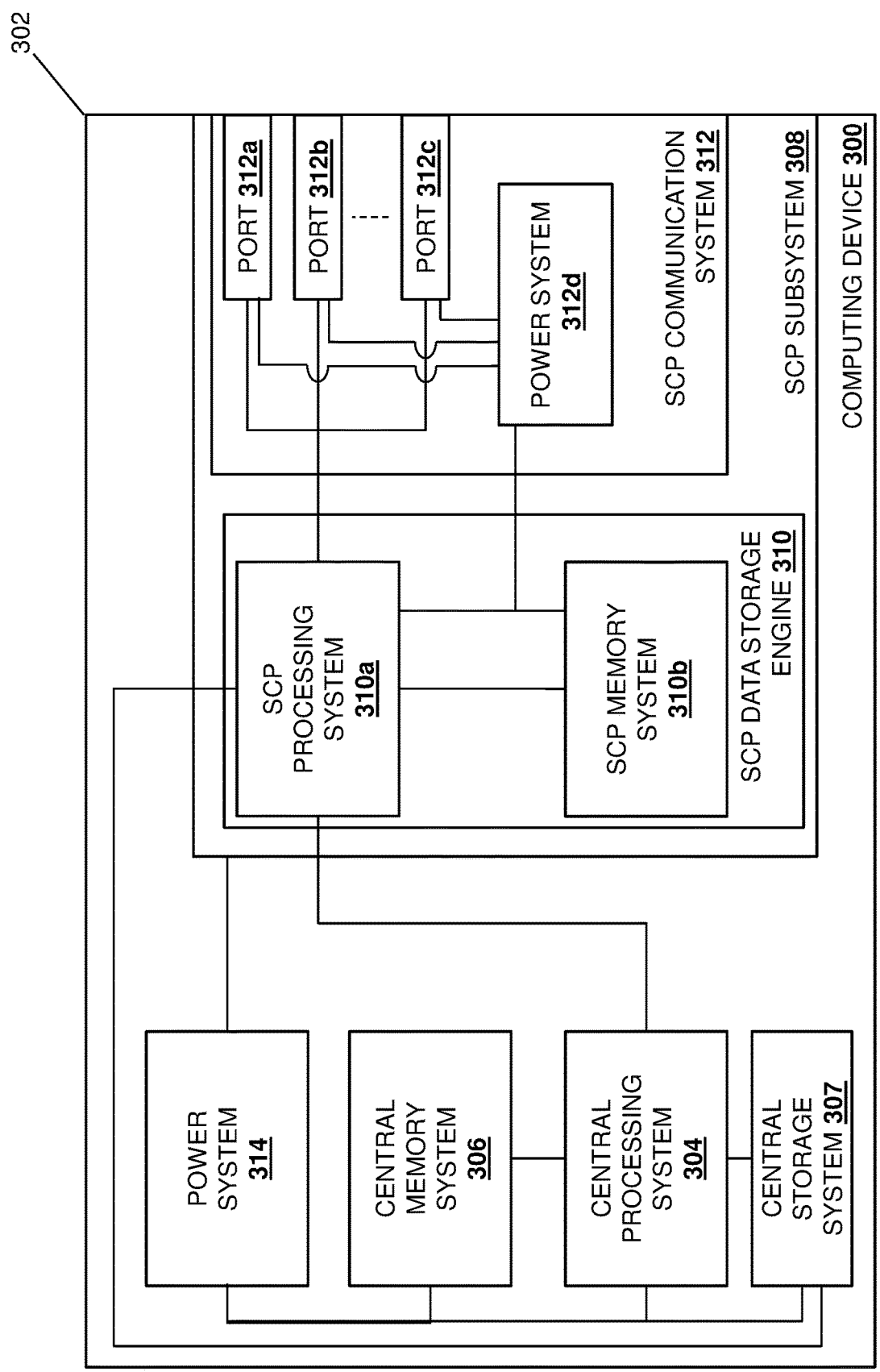
FIG. 3 is a schematic view illustrating an embodiment of a computing device that may be included in the networked system of FIG. 2 and that may provide the system control processor data mirroring system of the present disclosure.

Referring now to FIG. 3, an embodiment of a computing device 300 is illustrated that may provide the computing device 202 discussed above with reference to FIG. 2. As such, the computing device 300 may be provided by the IHS 100 discussed above with reference to FIG. 1 and/or may include some or all of the components of the IHS 100, and in specific examples described below is provided by a server device. However, while illustrated and discussed as being provided by a server device, one of skill in the art in possession of the present disclosure will recognize that the functionality of the computing device 300 discussed below may be provided by other devices that are configured to operate similarly as the computing device 300 discussed below. In some embodiments, the computing device 300 may be provided as Oct. 4, 2021, the disclosure of which is incorporated by reference in its entirety. As described in that application, the computing device 300 may be configured, when power is unavailable from its power system, to utilize power available via data/power ports in its SCP communication system in order to store data in network-attached storage devices. However, one of skill in the art in possession of the present disclosure will appreciate how the computing device 300 may not be configured without the data storage functionality described in U.S. patent application Ser. No. 17/492,731, filed on Oct. 4, 2021, while remaining within the scope of the present disclosure as well.

In the illustrated embodiment, the computing device 300 includes a chassis 302 that houses the components of the computing device 300, only some of which are illustrated and discussed below. For example, in the illustrated embodiments, the chassis 302 houses a central processing system 304 (e.g., a Central Processing Unit (CPU) such as the processor 102 discussed above with reference to FIG. 1) and a central memory system 306 (e.g., Dual Inline Memory Modules (DIMMs) such as the memory 114 discussed above with reference to FIG. 1) that is coupled to the central processing system 304 and that includes instructions that, when executed by the central processing system 304, cause the central processing system 304 to perform the functionality of the computing device 300 (e.g., to provide an operating system and/or application(s) that generate the data for mirroring as discussed below). The chassis 302 may also house a central storage system 304 (Hard Disk Drives (HDDs) or Solid-State Drives (SSDs) such as the storage 108 discussed above with reference to FIG. 1) that is coupled to the central processing system 304 and that is configured to provide for persistent storage of data.

The chassis 302 may also house a System Control Processor (SCP) subsystem 308 that is coupled to the central processing system 304. In some examples, the SCP subsystem 308 may be conceptualized as an "enhanced" SmartNIC device that may be configured to perform functionality that is not available in conventional SmartNIC devices such as, for example, the data storage functionality described herein. However, while the data storage functionality of the present disclosure is illustrated and described as an enhanced SmartNIC device provided by an SCP subsystem, one of skill in the art in possession of the present disclosure will appreciated that the data mirroring functionality described herein may be enabled on other devices while remaining within the scope of the present disclosure as well.

In an embodiment, the SCP subsystem 308 may be provided by the IHS 100 discussed above with reference to FIG. 1 and/or may include some or all of the components of the IHS 100. In specific examples, the SCP subsystem 308 may be provided as an SCP card that is configured to connect to a slot on a motherboard in the chassis 302. In other examples, the SCP subsystem 308 may be integrated into a motherboard in the chassis 302. In yet other examples the SCP subsystem 308 may be a separate/co-motherboard circuit board that is connected to a motherboard in the chassis 302 (e.g., a two-part motherboard having a first portion that enables conventional motherboard functionality, and a second portion that enables the SCP functionality discussed below). In a specific example, the SCP subsystem 308 may be referred to as a Data Processing Unit (DPU) that may be provided by a Peripheral Component Interconnect express (PCIe) card including Advanced Reduced Instruction Set Computing (RISC) Machine (ARM) core(s) and a network interface. However, while a few specific examples are provided, one of skill in the art in possession of the present disclosure will appreciate that the SCP subsystem 308 may be provided in the computing system 300 in a variety of manners that will fall within the scope of the present disclosure.

In the illustrated example, the SCP subsystem 308 includes an SCP processing system 310a and an SCP memory system 310b that includes instructions that, when executed by the SCP processing system 310a, cause the SCP processing system 310a to provide the SCP data storage engine 310 that is configured to perform the functionality of the SCP data storage engines and SCP subsystems discussed below. In a specific example, the SCP processing system 310a may be provided by any of a variety of microcontrollers that one of skill in the art in possession of the present disclosure would recognize as being capable of performing the functionality discussed below, and the SCP memory system 310b may be a volatile memory system such as a Random Access Memory (RAM), or may include at least a portion of volatile memory. As can be seen in the specific example illustrated in FIG. 3, the SCP processing system is coupled to the central processing system 304 and the central storage system 307.

In the illustrated example, the SCP subsystem 308 also includes an SCP communication system 312 that is coupled to the SCP data storage engine 310 (e.g., via a coupling between the SCP communication system 312 and the SCP processing system 310a) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. As illustrated, the SCP communication system 312 may include a plurality of ports 312a, 312b, and up to 312c. In at least some of the embodiments illustrated and described below, each of the ports 312a-312c may be a data/power port (e.g., a PoE-capable port) that is configured to receive both data and power via a single data/power cable connected to that port, although embodiments in which only subsets of the ports 312a-312c are data/power ports will fall within the scope of the present disclosure as well. As such, the SCP communication system 312 includes a power system 312d (e.g., a PoE power system) that may be coupled to each of the ports 312a-312c (e.g., when each of those ports are data/power ports as discussed above), the SCP processing system 310a, and the SCP memory system 310b, and the power system 312d may be configured to receive power from the ports 312a-312c and provide at least some of that power for utilization by the SCP communication system 312, the SCP processing system 310a, and the SCP memory system 310b.

As described in U.S. patent application Ser. No. 17/492,731, filed on Oct. 4, 2021, PoE ports and power systems may be limited in the amount of power available from each of those ports, and thus the SCP processing system 310a, the SCP memory system 310b, and the SCP communication system 312 may be selected or configured to utilize the power available from the ports 312a-312c and power system 312d in order to perform the functionality discussed below. As such, the power available from the ports 312a, 312b, and/or 312c may dictate the type of SCP processing system 310a and SCP memory system 310b utilized in the SCP subsystem 308 based on, for example, the power consumption of those components when performing the data storage functionality discussed below.

The chassis 302 may also house a power system 314 that is illustrated as coupled to the central processing system 304, the central memory system 306, the central storage system 307, the SCP subsystem 308, and/or any other components in the computing device 300. As will be appreciated by one of skill in the art in possession of the present disclosure, the power system 314 may include Power Supply Unit(s) (PSU(s)), power adapters, and/or other power components that are configured to be connected to a power source (e.g., via a wall outlet) in order to provide power from that power source to the computing device 300 to power all of the components in the computing device 300. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
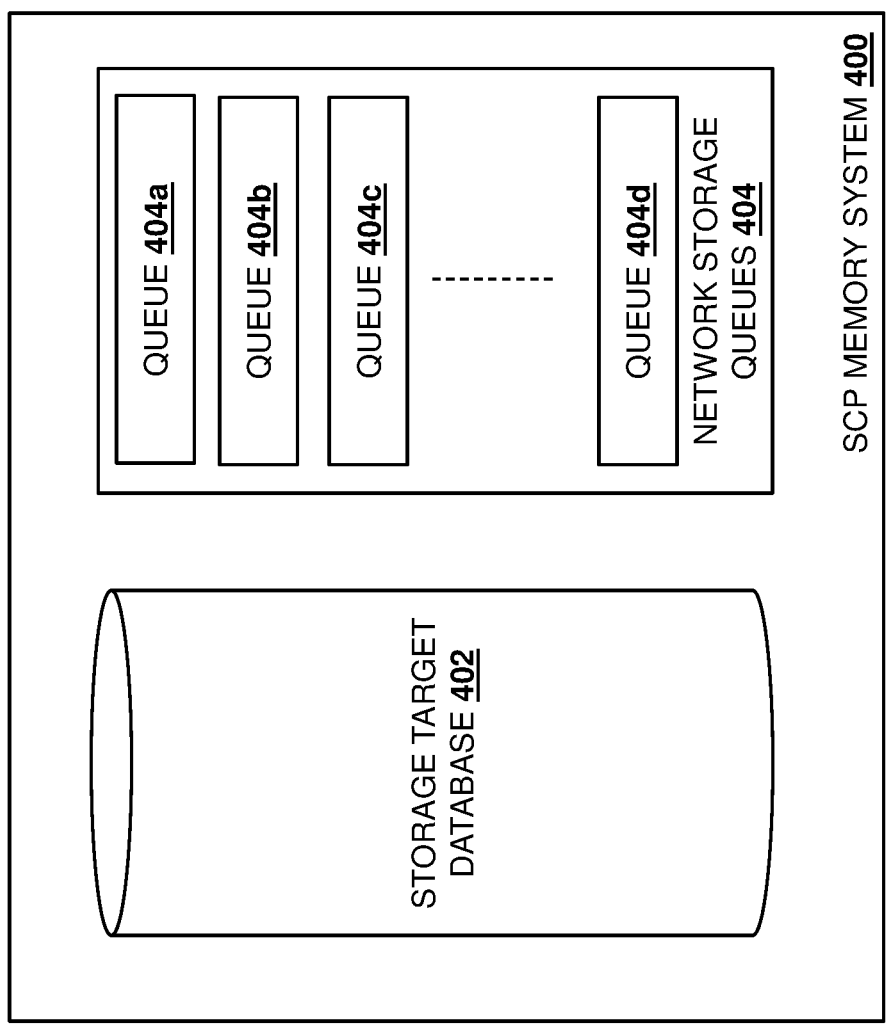
FIG. 4 is a schematic view illustrating an embodiment of a system control processor memory system that may be included in the computing device of FIG. 3.

With reference to FIG. 4, an embodiment of an SCP memory system 400 is illustrated that may provide the SCP memory system 310b discussed above with reference to FIG. 3. As such, the SCP memory system 400 may be provided by volatile memory system such as a Random Access Memory (RAM), or may include at least a portion of volatile memory. In the illustrated embodiment, the SCP memory system 400 includes a storage target database 402 that may identify storage device targets that may be provided by any of the storage devices 208a-208c discussed above with reference to FIG. 2. In the illustrated embodiment, the SCP memory system 400 also include a plurality of network storage queues 404 that include a queue 404a, a queue 404b, a queue 404c, and up to a queue 404d. As discussed below, the queues 404a-404d may be provided different priorities in order to prioritize the data mirroring operations discussed below that mirror data to network-attached storage devices at different times based on the different priorities of the queues in which that data is stored.

As such, in a specific example, the queue 404a may have a highest priority, the queue 404b may have a second higher priority, the queue 404c may have a third highest priority, and so on up to the queue 404d having a lowest priority. However, while specific prioritization of queues is discussed, one of skill in the art in possession of the present disclosure will appreciate how any of a variety of prioritizations of the queues 404a-404d in the network storage queues 404. Furthermore, while a specific SCP memory system 400 has been illustrated and described, one of skill in the art in possession of the present disclosure will recognize how the memory system in the SCP subsystem 308 may be configured in a variety of manners that will provide the SCP data mirroring functionality discussed below while remaining within the scope of the present disclosure as well.

Figure 5:
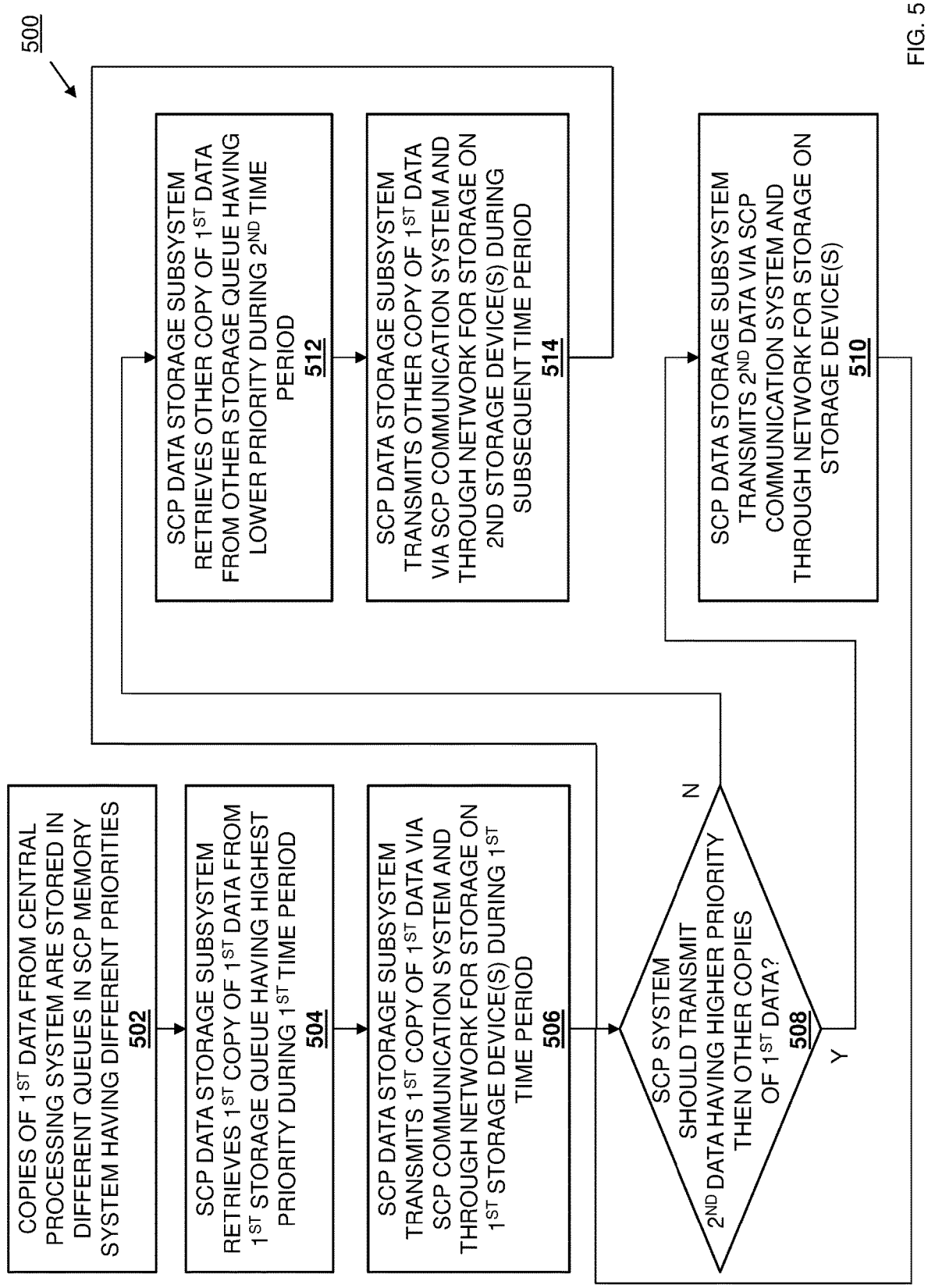
FIG. 5 is a flow chart illustrating an embodiment of a method for system control processor data mirroring.

Referring now to FIG. 5, an embodiment of a method 500 for SCP data mirroring is illustrated. As discussed below, the systems and methods of the present disclosure provide an SCP subsystem that uses prioritized queues for the redundant copying/mirroring of first data to ensure that the SCP subsystem stores first data on a storage device during a first time period, while allowing second data to be handled by the SCP subsystem before the SCP subsystem stores a redundant copy/mirror of the first data on a backup storage system. The SCP data mirroring system of the present disclosure may include a chassis housing a central processing system and an SCP subsystem. The SCP subsystem includes an SCP memory system with different priority storage queues each storing a copy of data provided by the central processing system, along with an SCP communication system and an SCP data storage subsystem. During a first time period, the SCP data storage subsystem retrieves a first copy of the data from a first storage queue in the SCP memory system and transmits it via the SCP communication system and through a network for storage on first storage device(s). During a subsequent second time period, the SCP data storage system retrieves a second copy of the data from a lower priority second storage queue in the SCP memory system and transmits it via the SCP communication system and through the network for storage on second storage device(s). As such, data mirroring operations are offloaded from the central processing system, freeing up cycles of that central processing system and preventing data mirroring operations from interfering and/or degrading the steady state performance of that central processing system, while also preventing the lower priority redundant data copying portions of the data mirroring operations from preempting latency sensitive data traffic handled by the SCP subsystem.

The method 500 begins at block 502 where copies of first data from a central processing system are stored in different queues that are included in an SCP memory system and that have different priorities. As will be appreciated by one of skill in the art in possession of the present disclosure, during or prior to the method 500, the central processing system 304 may generate or otherwise provide data for which data mirroring operations/redundant copying is required. For example, the data provided for data mirroring operations/ redundant copying by the central processing system 304 may include database operations data, unstructured data files, logs, images, videos, audio recordings, and/or a variety of other data mirroring/redundant copying data that would be apparent to one of skill in the art in possession of the present disclosure.

Figure 6A:
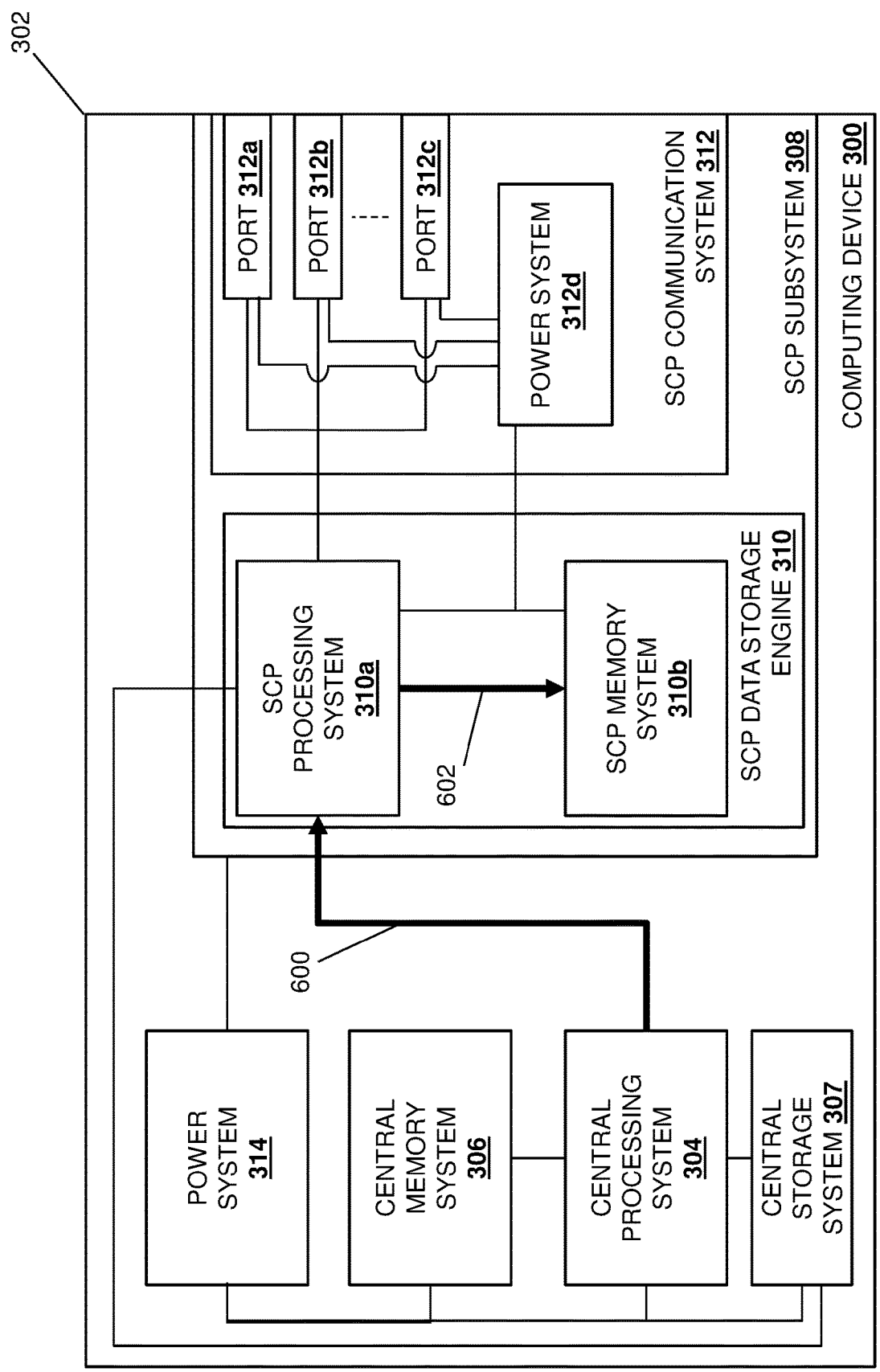
FIG. 6A is a schematic view illustrating an embodiment of the computing device of FIG. 3 operating during the method of FIG. 5.
Figure 6B:
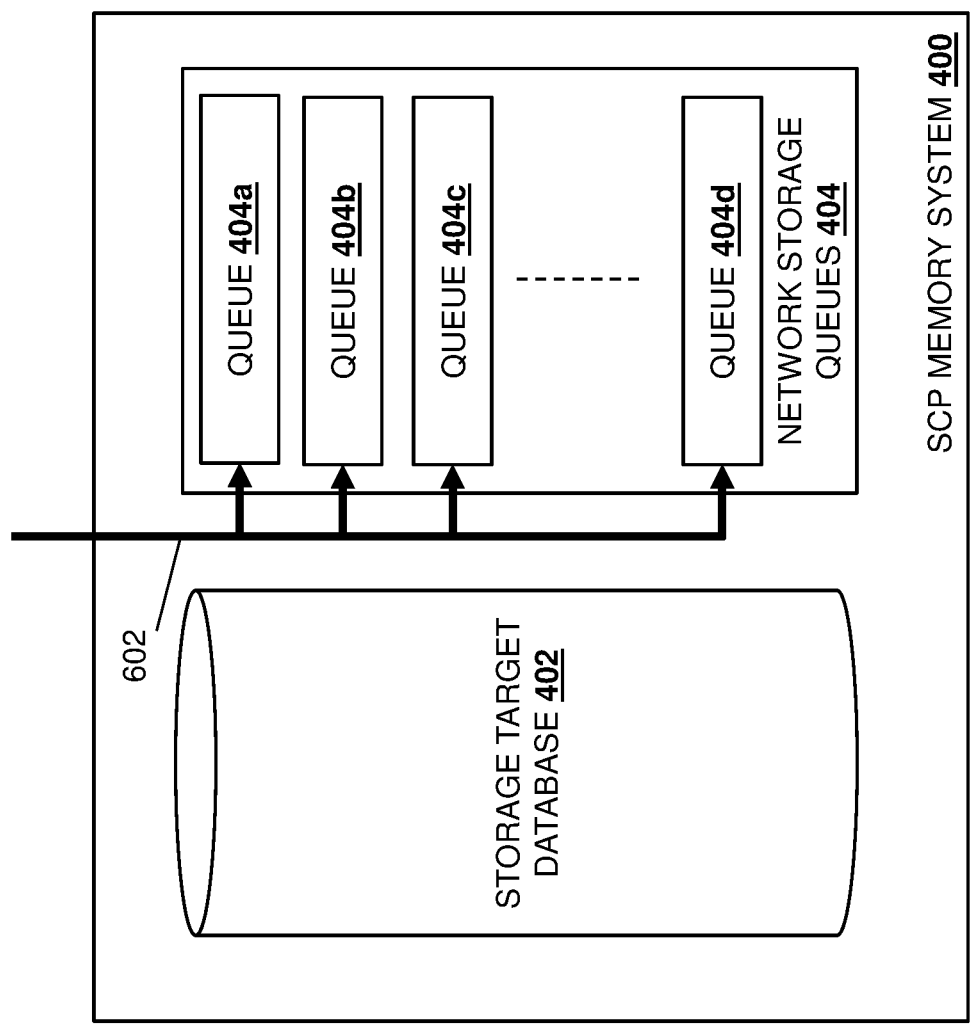
FIG. 6B is a schematic view illustrating an embodiment of the system controller processor memory system of FIG. 4 operating during the method of FIG. 5.

With reference to FIGS. 6A and 6B, in an embodiment of block 502, the central processing system 304 may perform data transmission operations 600 that may include transmitting data for storage to the SCP processing system 310a that provides the SCP data storage engine 310. In response to receiving the data from the central processing system 304, the SCP processing system 310a may then perform data cloning and queueing operations 602 that may include storing copies of the data received from the central processing system 304 in different queues 404a-404d of the network storage queues 404 in the SCP memory system 310b/400 that have different priorities. For example, the data cloning and queueing operations 602 may include the SCP processing system 310a storing a first copy of the data received from the central processing system 304 in the queue 404a that has a highest priority of the network storage queues 404 in the SCP memory system 310*b*/400, storing a second copy of the data received from the central processing system 304 in the queue 404*b* that has a second highest priority of the network storage queues 404 in the SCP memory system 310*b*/400, storing a third copy of the data received from the central processing system 304 in the queue 404*c* that has a third highest priority of the network storage queues 404 in the SCP memory system 310*b*/400, and up to storing a last copy of the data received from the central processing system 304 in the queue 404*d* that has a lowest priority of the network storage queues 404 in the SCP memory system 310*b*/400.

However, while the SCP processing system 310*a* is illustrated and described as receiving data from the central processing system 304 and storing copies of that data in different priority queues in the SCP memory system 310*b*/400, in other embodiments the central processing system 304 may perform the data cloning and queueing operations 602 discussed above to store copies of data directly in the different priority queues in the SCP memory system 310*b*/400. For example, the central processing system 304 may include a direct connection to the SCP memory system 310*b*/400 and, as such, data cloning and queueing operations performed by the central processing system 304 may include the central processing system 304 storing a first copy of data directly in the queue 404*a* that has a highest priority of the network storage queues 404 in the SCP memory system 310*b*/400, storing a second copy of the data directly in the queue 404*b* that has a second highest priority of the network storage queues 404 in the SCP memory system 310*b*/400, storing a third copy of the data directly in the queue 404*c* that has a third highest priority of the network storage queues 404 in the SCP memory system 310*b*/400, and up to storing a last copy of the data directly in the queue 404*d* that has a lowest priority of the network storage queues 404 in the SCP memory system 310*b*/400.

One of skill in the art in possession of the present disclosure will appreciate that while four (or more) copies of the same data are described as being stored in four different queues each having different priorities, in many situations it may be sufficient to store two copies of data in two different priority queues in the network storage queues 404 (i.e., to allow for the storage of one copy of the data in a network-attached storage device, and the storage of one copy of the data in a network-attached backup storage system, discussed in further detail below). As such, one of skill in the art in possession of the present disclosure will appreciate that the prioritized queueing of any number of multiple copies in different priority queues in the network storage queues 404 (e.g., based on the number of redundant copies required for the data received from the central processing system 304 at block 502) will fall within the scope of the present disclosure.

Figure 7A:
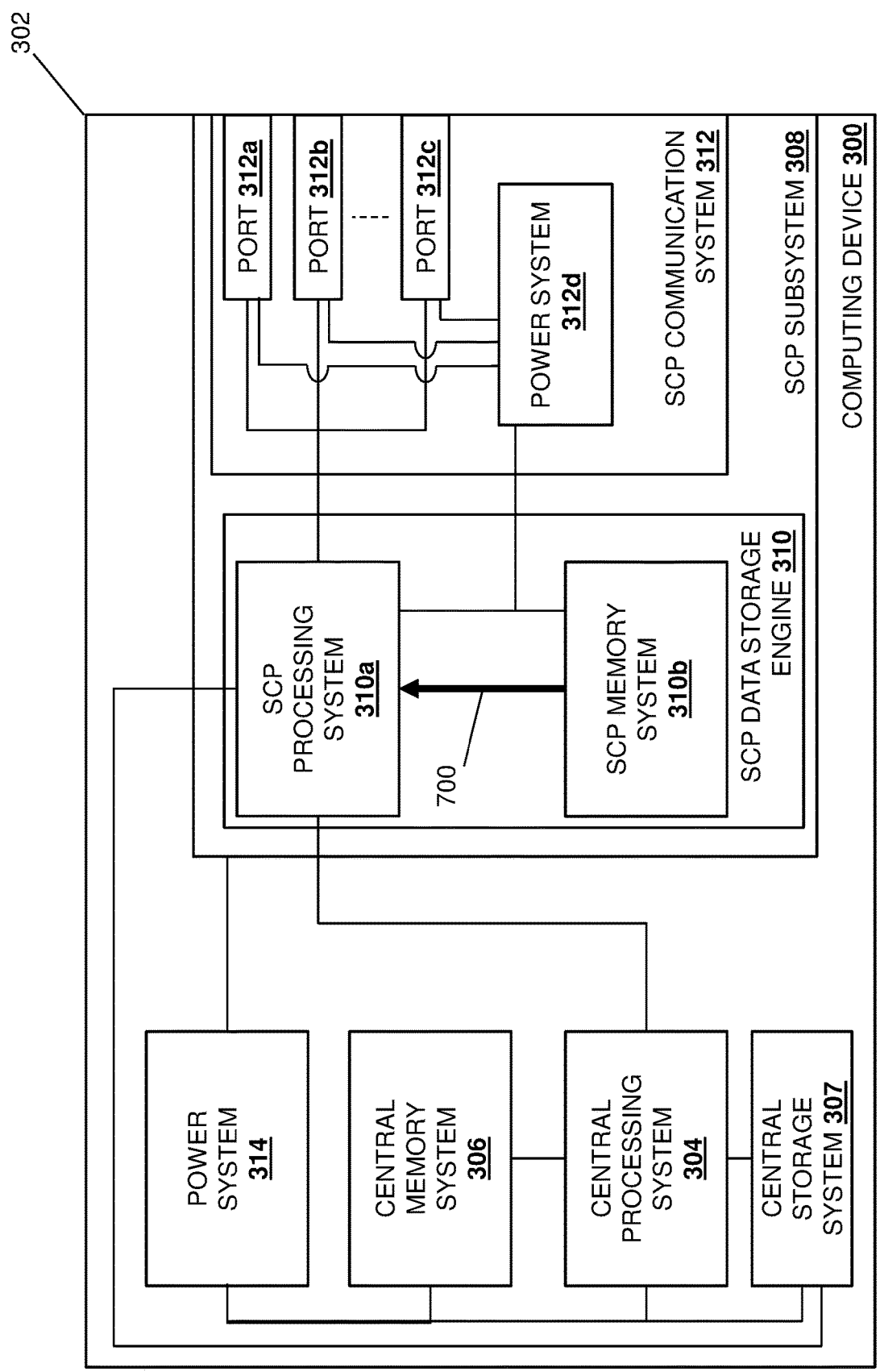
FIG. 7A is a schematic view illustrating an embodiment of the computing device of FIG. 3 operating during the method of FIG. 5.
Figure 7B:
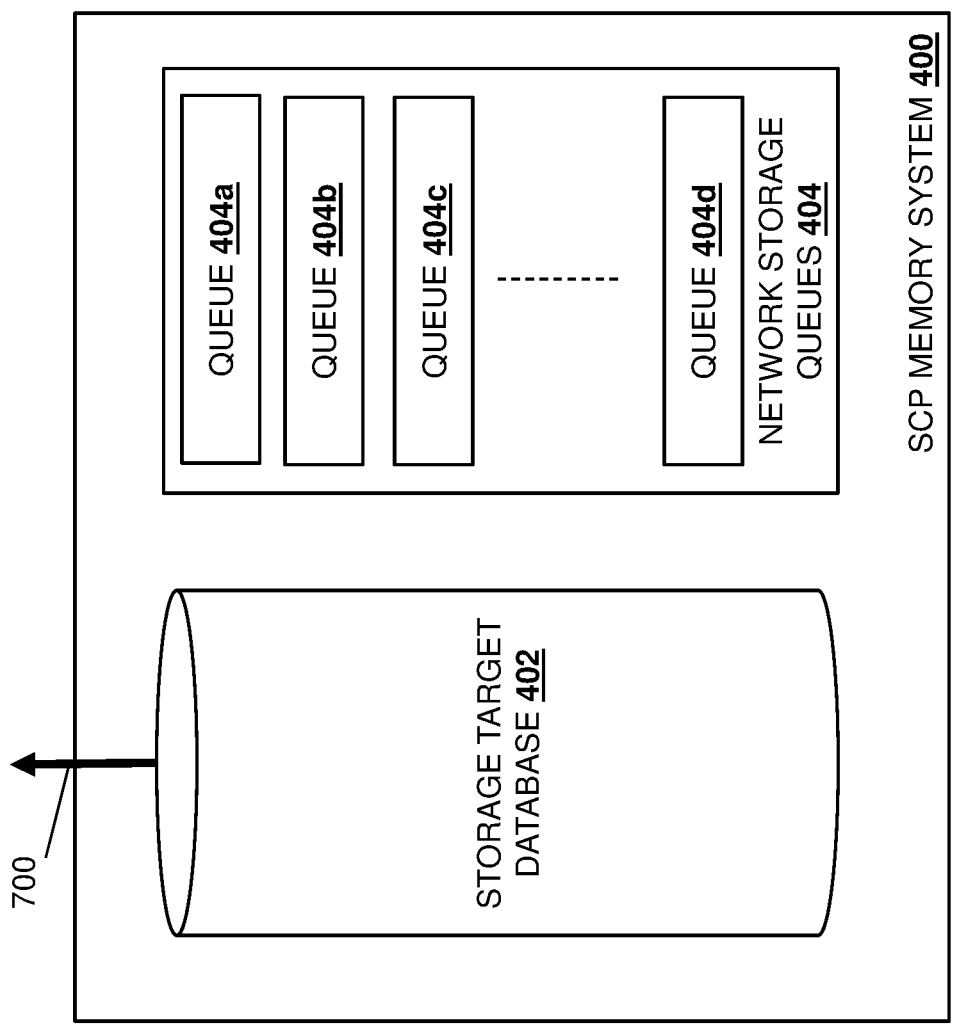
FIG. 7B is a schematic view illustrating an embodiment of the system controller processor memory system of FIG. 4 operating during the method of FIG. 5.
Figure 8A:
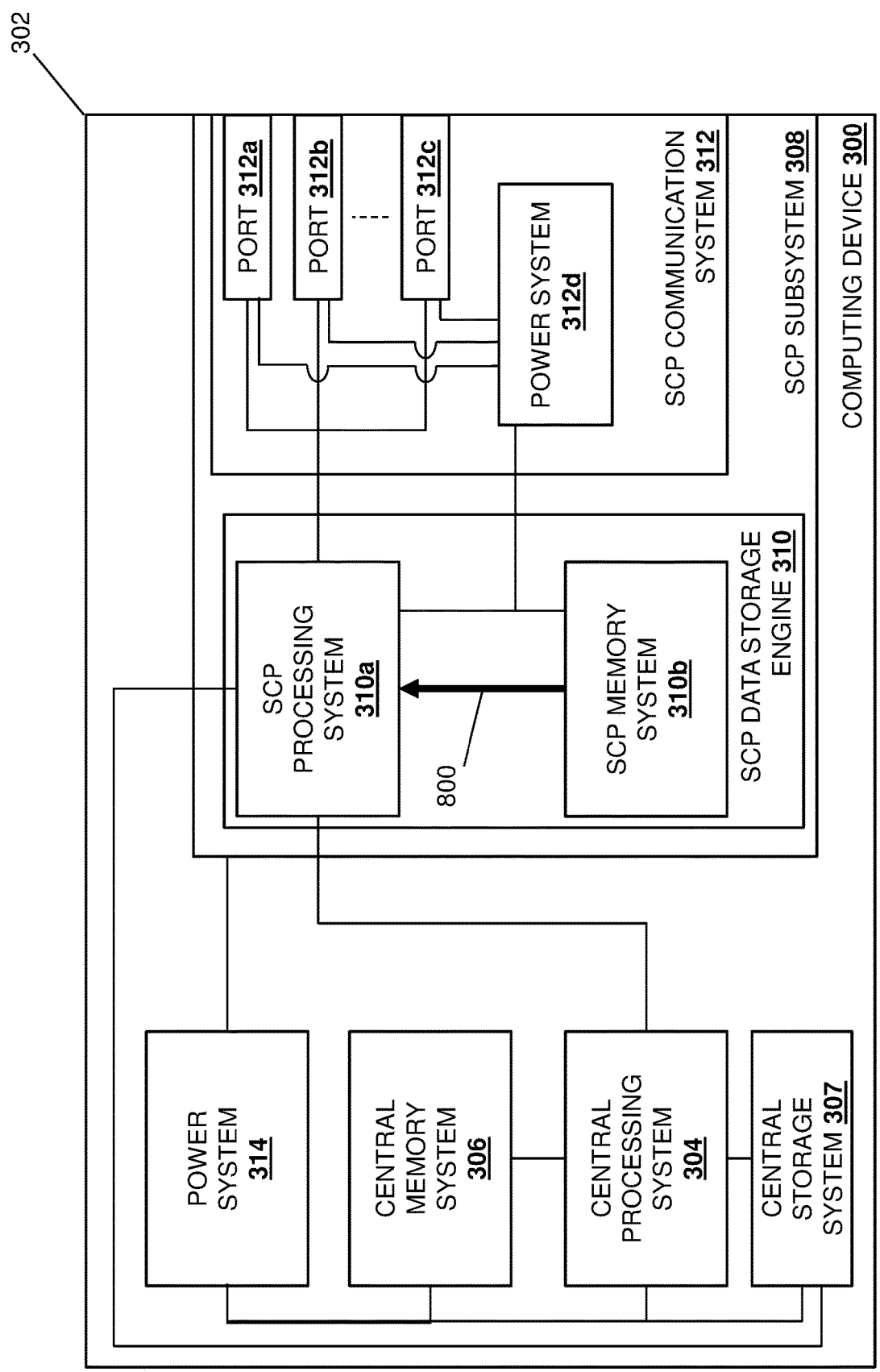
FIG. 8A is a schematic view illustrating an embodiment of the computing device of FIG. 3 operating during the method of FIG. 5.
Figure 8B:
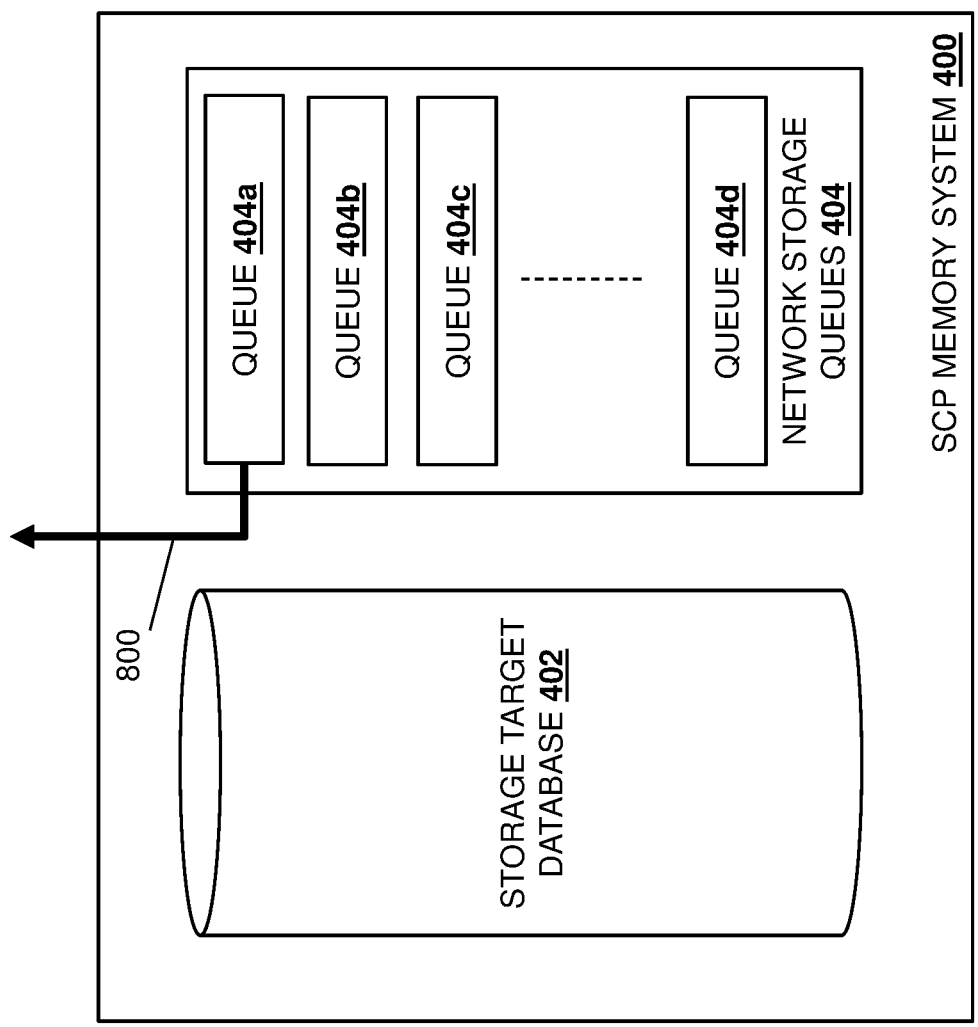
FIG. 8B is a schematic view illustrating an embodiment of the system controller processor memory system of FIG. 4 operating during the method of FIG. 5.

The method 500 then proceeds to block 504 where an SCP data storage subsystem retrieves a first copy of first data from a first queue having a highest priority during a first time period. With reference to FIGS. 7A and 7B, during or prior to block 504, the SCP processing system 310*a* that provides the SCP data storage engine 310 may perform storage target identification operations 700 that include accessing the storage target database 402 in the SCP memory system 310*b*/400 and identifying storage targets for the data stored in the network storage queues 404 in the SCP memory system 310*b*/400 at block 502. In an embodiment, the storage targets for the data stored in the network storage queues 404 in the SCP memory system 310*b*/400 at block 502 may include any of the storage devices 208*a*, 208*b*, and up to 208*c*, as well as the backup storage system 210. As such, while the specific example below describes the storage target for the data stored in the queue 404*a* in the network storage queues 404 in the SCP memory system 310*b*/400 at block 502 being the storage device 208*a*, and the storage target for the data stored in the queues 404*b*-404*d* in the network storage queues 404 in the SCP memory system 310*b*/400 at block 502 being the backup storage system 210, the storage of that data in any combination of the storage devices 208*a*-208*c* and the backup storage system 210 will fall within the scope of the present disclosure as well. With reference to FIGS. 8A and 8B, in an embodiment of block 504, the SCP processing system that provides the SCP data storage engine 310 may perform highest priority queued data retrieval operations 800 that include retrieving the copy of the data that was stored in the queue 404*a* of the network storage queues 404 in the SCP memory system 310*b*/400 at block 502 that has the highest priority.

Figure 9A:
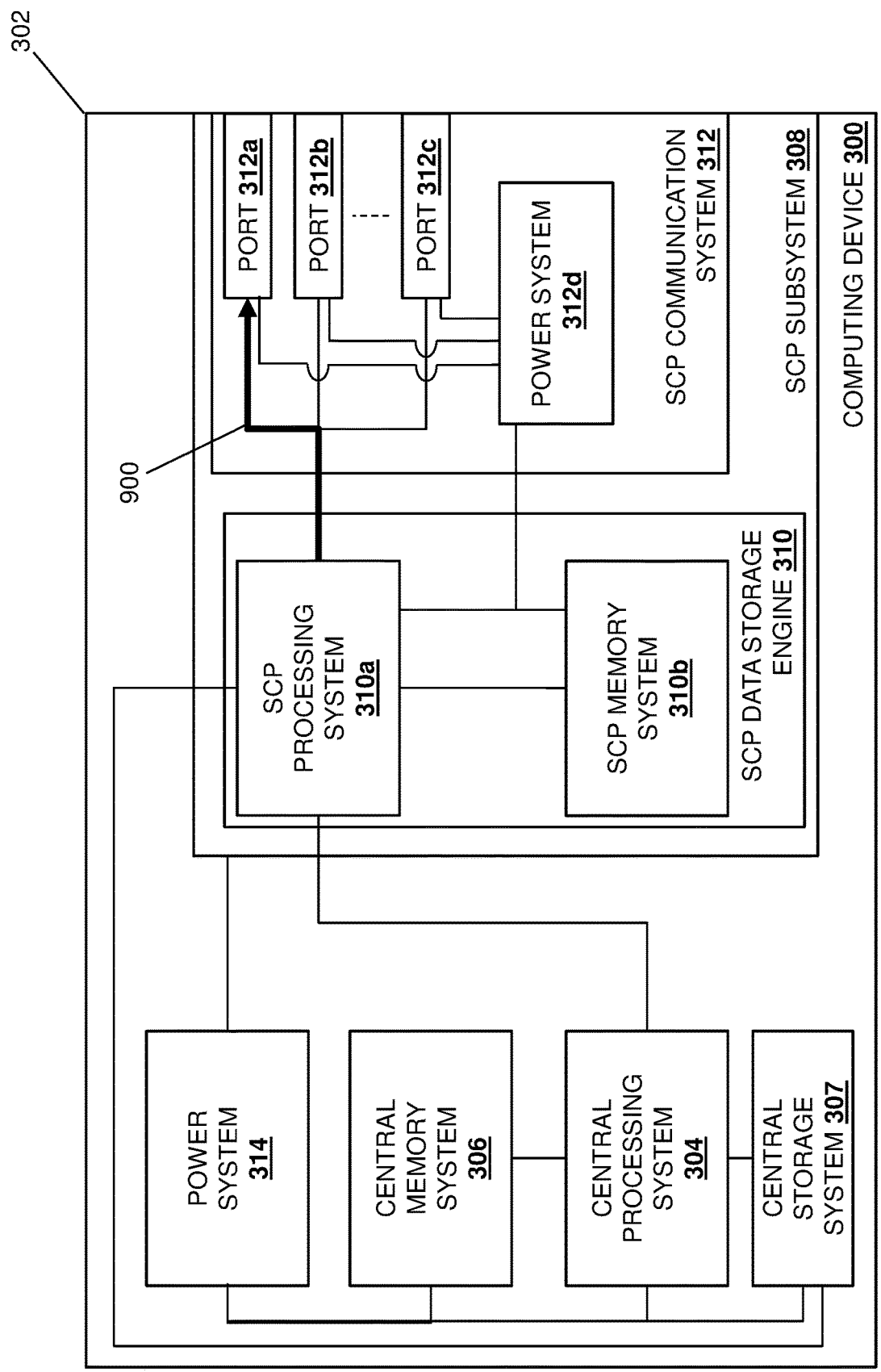
FIG. 9A is a schematic view illustrating an embodiment of the computing device of FIG. 3 operating during the method of FIG. 5.

The method 500 then proceeds to block 506 where the SCP data storage subsystem transmits the first copy of first data via an SCP communication system and through a network for storage on first storage device(s) during the first time period. With reference to FIGS. 9A and 9B, in an embodiment of block 506, the SCP processing system 310*a* that provides the SCP data storage engine 310 may perform data storage transmission operations 900 that include transmitting, based on the storage target(s) identified at block 504, the data retrieved from the queue 404 at block 504 via the port 312*a* in the SCP communication system 312, through the networking device 204 and the network 206, and to the storage device 208*a*, which one of skill in the art in possession of the present disclosure will recognize may provide for the storage of that data on the storage device 208*a*. One of skill in the art in possession of the present disclosure will recognize the handling of the data by the SCP subsystem 308 to store it in the storage device 208*a* is performed in the "background" from the perspective of the central processing system 304. As will be appreciated by one of skill in the art in possession of the present disclosure, the data storage transmission operations 900 may be performed during a first time period, which may include or be shortly after that data was stored in the queue 404*a* of the network storage queues 404 in the SCP memory system 310*b*/400 in order ensure that a copy of that data is stored on the network-attached storage device 208*a*. In other words, the copy of the data stored in the highest priority queue of the network storage queues in the SCP memory system 310*b*/400 may be transmitted for storage in one of the storage devices 208*a*-208*c* relatively quickly in order to ensure that the data provided by the central processing system 304 at block 502 is persistently stored in the networked system 200.

The method 500 then proceeds to decision block 508 where it is determined whether an SCP system should second data having a higher priority than other copies of the first data stored in the queues in the SCP memory system. As discussed above, the SCP subsystem 308 may be configured to handle data for the computing device 300 by, for example, transmitting that data via its SCP communication system 312 (e.g., for storage, to other computing systems, etc.), as well as performing other data handling operations that would be apparent to one of skill in the art in possession of the present disclosure. As will be appreciated by one of skill in the art in possession of the present disclosure, such data be latency sensitive or may otherwise be prioritized for transmission via the SCP communication system 312 over the redundant copy/copies of data stored in the queues 404*b*-404*d* discussed above (e.g., because the redundant copy/copies of data are associated with the copy of that data that was persistently stored in the storage device 208a at block 506). As such, in an embodiment of decision block 508, the SCP data storage engine 310 may determine whether the SCP subsystem 308 is (or will be) handling latency-sensitive data (or other data traffic) that has a higher priority than the redundant copy/copies of data stored in the queues 404b-404d, which as discussed below ensures that those redundant copy/copies due not utilize the resources of the SCP communication system 312 until all other higher priority data traffic has been handled using the SCP communication system 312.

Figure 10A:
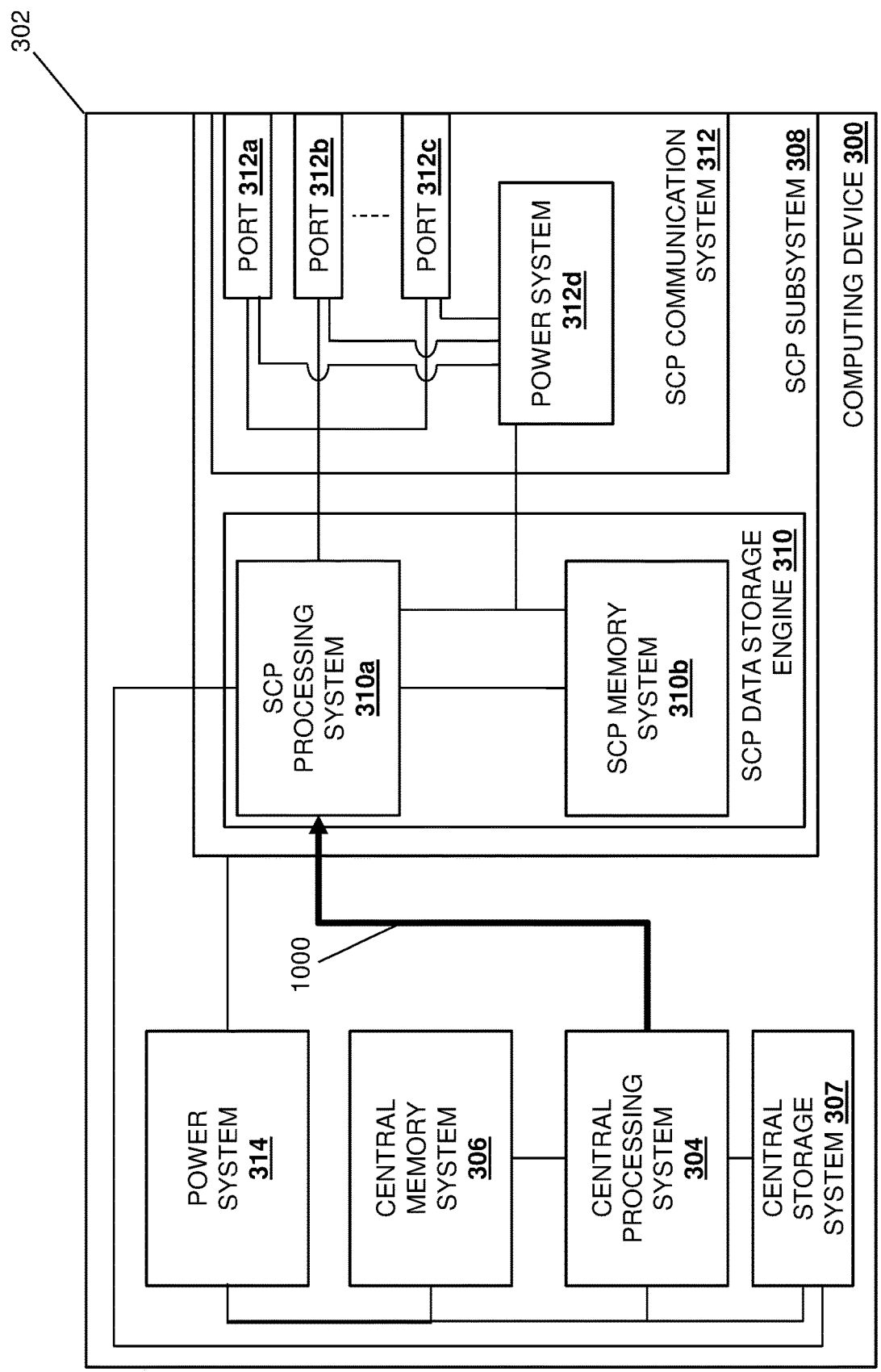
FIG. 10A is a schematic view illustrating an embodiment of the computing device of FIG. 3 operating during the method of FIG. 5.

If, at decision block 508, it is determined that the SCP system should transmit second data having a higher priority than other copies of the first data stored in the queues in the SCP memory system, the method 500 proceeds to block 510 where the SCP data storage subsystem transmits the second data via the SCP communication system and through the network for storage on storage device(s). With reference to FIG. 10A, in an embodiment of decision block 508 or block 510, the central processing system 304 may perform data transmission operations 1000 that include transmitting data to the SCP processing system 310a that provides the SCP data storage engine 310. As will be appreciated by one of skill in the art in possession of the present disclosure, during the method 500, the central processing system 304 may generate or otherwise provide data that is latency-sensitive or otherwise prioritized over the redundant copies of data stored in the queues 404a-404d in the network storage queues 404. For example, the data provided for by the central processing system 304 at decision block 508 and/or block 510 may include inventory database updates, financial transactions, reservations, real-time control data for emergency operations, and/or a variety of other data that would be apparent to one of skill in the art in possession of the present disclosure.

Figure 10B:
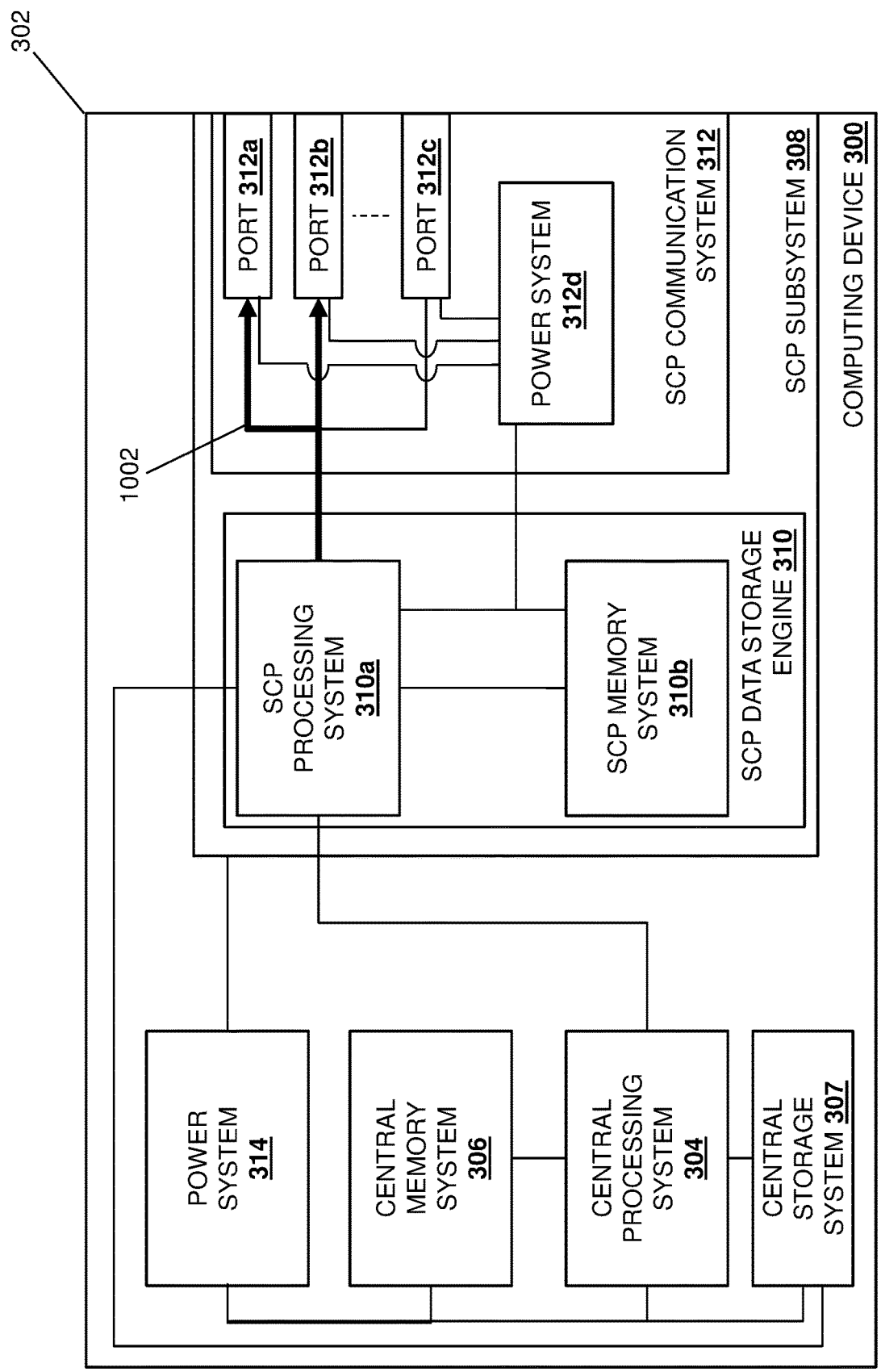
FIG. 10B is a schematic view illustrating an embodiment of the computing device of FIG. 3 operating during the method of FIG. 5.

With reference to FIGS. 10B and 100, in an embodiment of block 510, the SCP processing system 310a that provides the SCP data storage engine 310 may perform data storage transmission operations 1002 that include transmitting the data received form the central processing system 304 at decision block 508 or block 510 via the ports 312a or 312b (or other ports) in the SCP communication system 312, through the networking device 204 and the network 206, and to the storage devices 208a, 208b, or 208c (or other storage devices), which one of skill in the art in possession of the present disclosure will recognize may provide for the storage of that data on the storage devices 208a, 208b, or 208c (or other storage devices). One of skill in the art in possession of the present disclosure will recognize the handling of the data by the SCP subsystem 308 to store it in the storage devices 208a, 208b, or 208c is performed in the "background" from the perspective of the central processing system 304. As will be appreciated by one of skill in the art in possession of the present disclosure, the data storage transmission operations 1002 may be performed following the first time period in which the data from the queue 404a of the network storage queues 404 in the SCP memory system 310b/400. In other words, the copy of the data stored in the highest priority queue of the network storage queues 404 in the SCP memory system 310b/400 at block 506 may have been prioritized (e.g., because it was received earlier, etc.) over the data received from the central processing system 304 at decision block 508 or block 510. The method 500 then returns to decision block 508. As such, the method 500 may loop following the storage of the data from the queue 404a of the network storage queues 404 in the SCP memory system 310b/400 at block 506 in order to transmit data having a higher priority than the other copies of the data stored in the queues 404b-404d of the network storage queues 404 in the SCP memory system 310b/400 as long as that higher priority data is being provided to or otherwise handed by the SCP subsystem 308.

Figure 11A:
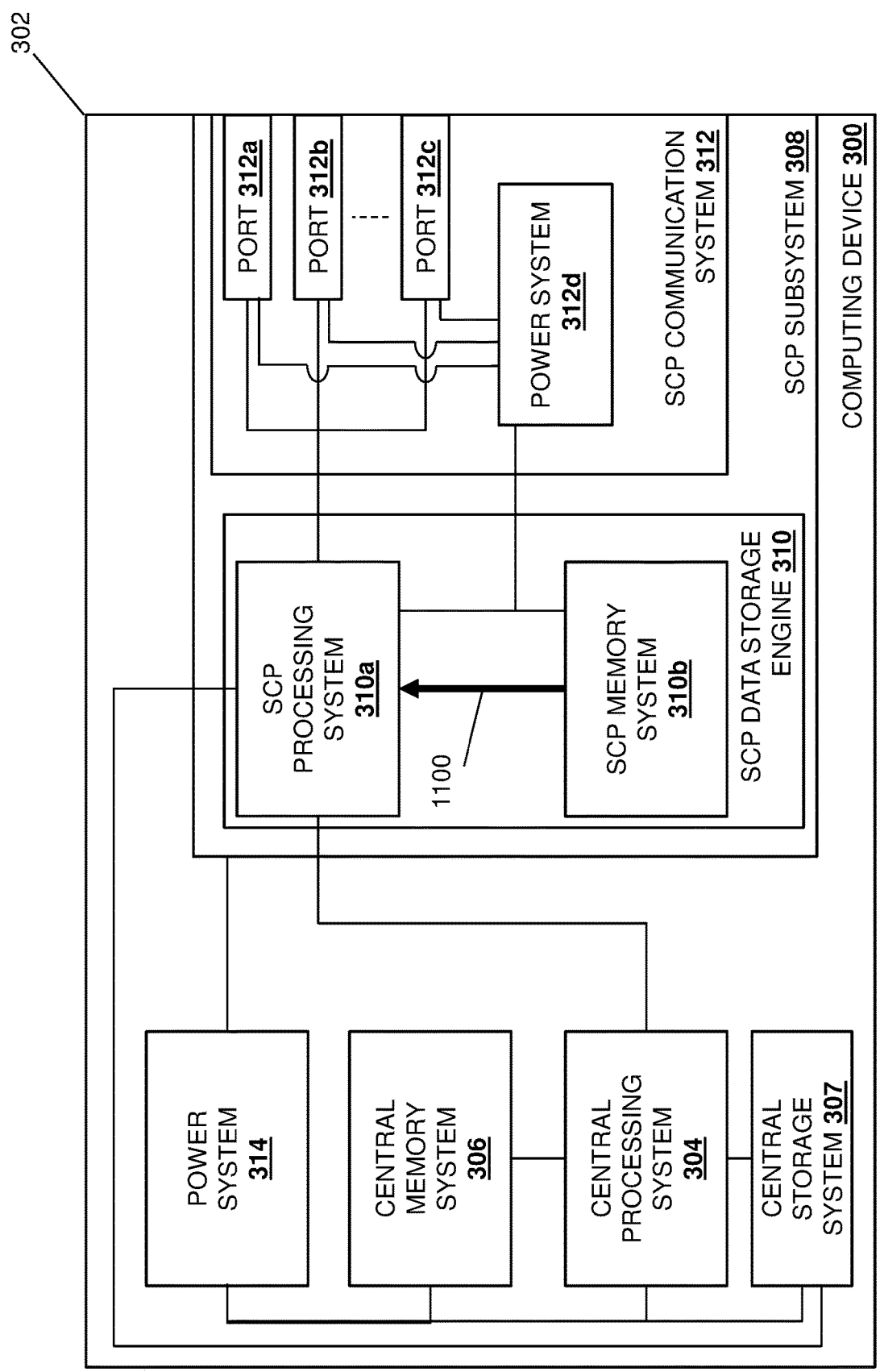
FIG. 11A is a schematic view illustrating an embodiment of the computing device of FIG. 3 operating during the method of FIG. 5.
Figure 11B:
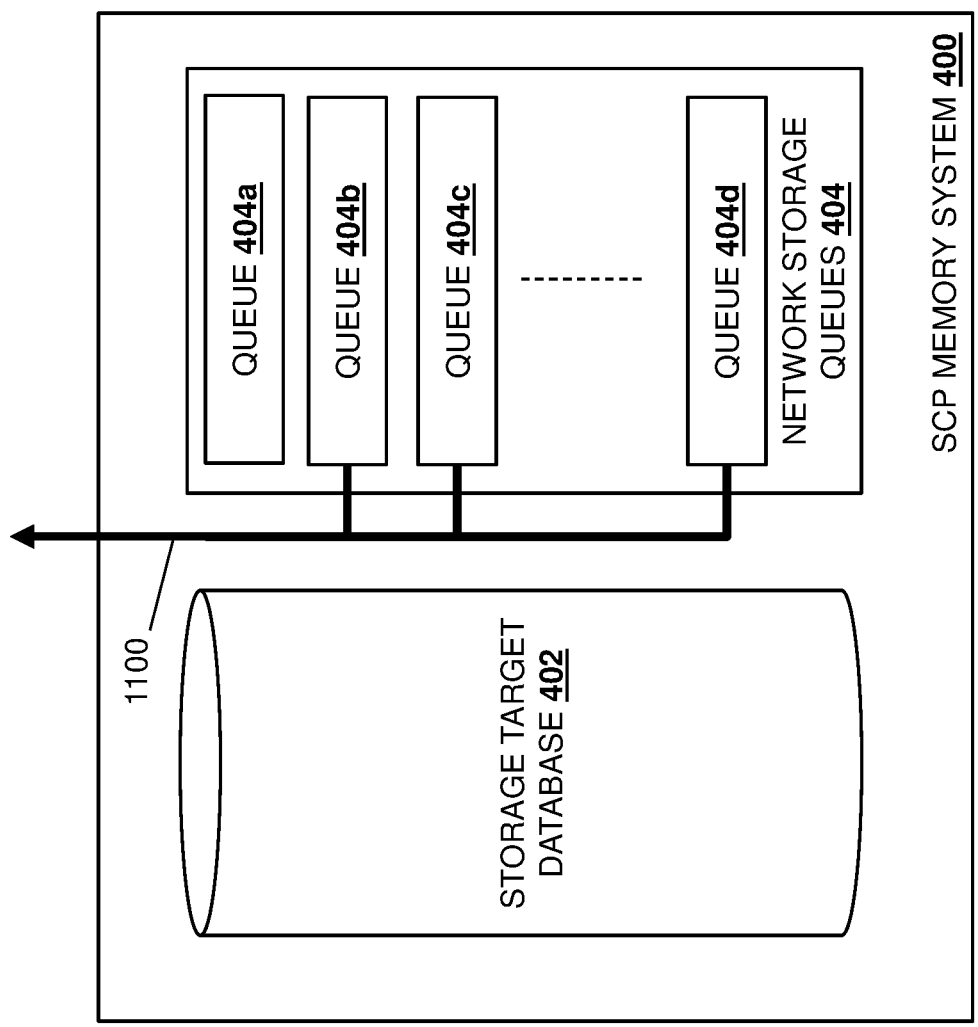
FIG. 11B is a schematic view illustrating an embodiment of the system controller processor memory system of FIG. 4 operating during the method of FIG. 5.

If at decision block 508, it is determined that the SCP system is not transmitting second data having a higher priority than other copies of the first data stored in the queues in the SCP memory system, the method 500 proceeds to block 512 where the SCP data storage subsystem retrieves an other copy of first data from an other storage queue having a lower priority during a subsequent time period. With reference to FIGS. 11A and 11B, in an embodiment of block 504, the SCP processing system that provides the SCP data storage engine 310 may perform lower priority queued data retrieval operations 1100 that include retrieving at least one copy of the data that was stored in the queues 404b-404d of the network storage queues 404 in the SCP memory system 310b/400 at block 502 that has a relatively lower priority than the queue 404a. As discussed above with reference to FIGS. 8A and 8B, at block 504 the SCP processing system 310a that provides the SCP data storage engine 310 may have already performed storage target identification operations 700 that include accessing the storage target database 402 in the SCP memory system 310b/400 and identifying storage targets for the data stored in the network storage queues 404 in the SCP memory system 310b/400. However, one of skill in the art in possession of the present disclosure will appreciate how the identification of storage targets for the data stored in the queues 404b-404d of the network storage queues 404 in the SCP memory system 310b/400 may be performed along with the retrieval of that data from the queues 404b-404d while remaining within the scope of the present disclosure as well.

Figure 12A:
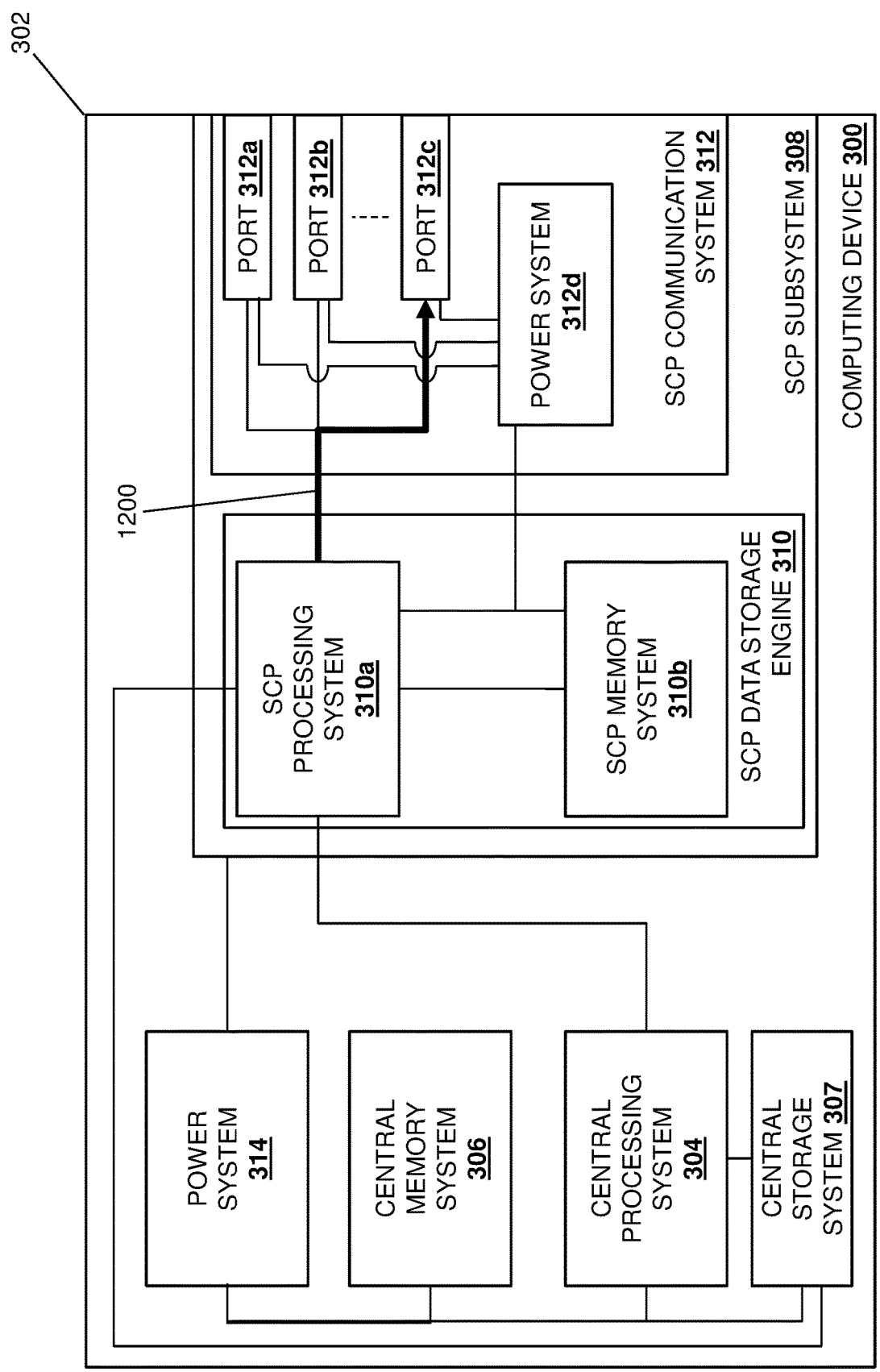
FIG. 12A is a schematic view illustrating an embodiment of the computing device of FIG. 3 operating during the method of FIG. 5.

The method 500 then proceeds to block 514 where the SCP data storage subsystem transmits the other copy of first data via the SCP communication system and through the network for storage on second storage device(s) during the subsequent time period. With reference to FIGS. 12A and 12B, in an embodiment of block 514, the SCP processing system 310a that provides the SCP data storage engine 310 may perform data storage transmission operations 1200 that include transmitting, based on the storage target(s) identified at block 504 (or at block 512), the data retrieved from the queues 404b-404d at block 512 via the port 312c in the SCP communication system 312, through the networking device 204 and the network 206, and to the backup storage system 210, which one of skill in the art in possession of the present disclosure will recognize may provide for the redundant storage of a redundant copy/copies of that data that is already stored on the storage device 208a. One of skill in the art in possession of the present disclosure will recognize the handling of the data by the SCP subsystem 308 to store it in the backup storage system 210 is performed in the "background" from the perspective of the central processing system 304. As will be appreciated by one of skill in the art in possession of the present disclosure, the data storage transmission operations 1200 may be performed during a second time period that is subsequent to the first time period in which the copy of the data in the queue 404a was stored, and which may be some third time period following the first time period due to the transmission of the higher priority data at block 510. In other words, the copy/copies of the data stored in the lower priority queues of the network storage queues in the SCP memory system 310b/400 may be transmitted for storage in backup storage system 310 only after higher priority data (e.g., latency-sensitive data) is handled by the SCP system 308.

The method 500 then returns to decision block 508. As such, the method 500 may loop such that following the storage of at least one redundant copy of the data from the queues 404b-404d of the network storage queues 404 in the SCP memory system 310b/400 at block 514, data having a higher priority than the other copies of the data stored in the queues 404b-404d of the network storage queues 404 in the SCP memory system 310b/400 will be transmitted as long as that higher priority data is being provided to or otherwise handed by the SCP subsystem 308, followed by the storage of at least one other redundant copy of the data from the queues 404b-404d of the network storage queues 404 in the SCP memory system 310b/400, as so on until all of the redundant copies of the data that was stored in the queues 404a-404d of the network storage queues 404 in the SCP memory system 310b/400 at block 502 have been stored in the backup storage system 210. As will be appreciated by one of skill in the art in possession of the present disclosure, the prioritization of the queues 404a-404d of the network storage queues 404 may configured such that the data stored in the queue 404a is transmitted for storage in one or more of the storage devices 208a-208c as quickly as possible, while a first redundant copy of the data stored in the queues 404b-404d is stored in the backup storage system 210 following the handling of some first amount of latency-sensitive data traffic by the SCP subsystem 308 (e.g., to provide some Quality of Service (Qos) for that data traffic according to a Service Level Agreement (SLA)), a second redundant copy of the data stored in the queues 404b-404d is stored in the backup storage system 210 following the handling of some second amount of latency-sensitive data traffic by the SCP subsystem 308 (e.g., to provide some Qos for that data traffic according to an SLA), and so on until all the redundant copies of the data have been stored in the backup storage system 210.

Furthermore, as discussed above, the computing device 300 may be configured with the data storage functionality described in U.S. patent application Ser. No. 17/492,731, filed on Oct. 4, 2021, which describes how, when power is unavailable from its power system 314, the SCP subsystem 308 may utilize power available via data/power ports 312a-312c in its SCP communication system 312 in order to store data in network-attached storage devices, and one of skill in the art in possession of the present disclosure will recognize how the data mirroring operations performed via the queues 404a-404d of the network storage queues 404 in the SCP memory system 310b/400 may be utilized during such power unavailability situations to prioritize how copies of data are stored in the storage devices 208a-208c and the backup storage system 210 while remaining within the scope of the present disclosure.

Thus, systems and methods have been described that provide an SCP subsystem that uses prioritized queues for the redundant copying/mirroring of first data to ensure that the SCP subsystem stores first data on a storage device during a first time period, while allowing second data to be handled by the SCP subsystem before the SCP subsystem stores a redundant copy/mirror of the first data on a backup storage system. The SCP data mirroring system of the present disclosure may include a server housing a CPU and an SCP subsystem. The SCP subsystem includes an SCP memory system with different priority storage queues each storing a copy of data provided by the CPU, along with an SCP communication system and an SCP data storage subsystem. During a first time period, the SCP data storage subsystem retrieves a first copy of the data from a first storage queue in the SCP memory system and transmits it via the SCP communication system and through a network for storage on first storage device(s). During a subsequent second time period, the SCP data storage system retrieves a second copy of the data from a lower priority second storage queue in the SCP memory system and transmits it via the SCP communication system and through the network for storage on second storage device(s). As such, data mirroring operations are offloaded from the CPU, freeing up cycles of that CPU and preventing data mirroring operations from interfering and/or degrading the steady state performance of that CPU, while also preventing the lower priority redundant data copying portions of the data mirroring operations from preempting latency sensitive data traffic handled by the SCP subsystem.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A System Control Processor (SCP) data mirroring system, comprising:
   a chassis;
   a central processing system that is located in the chassis; and
   a System Control Processor (SCP) subsystem that is located in the chassis and coupled to the central processing system, wherein the SCP subsystem includes:
   an SCP memory system that includes a plurality of different storage queues that have different priorities and that are each configured to store a copy of first data provided by the central processing system;
   an SCP communication system that includes a plurality of ports; and
   an SCP data storage subsystem that is coupled to the SCP memory system and the SCP communication system and that is configured to:
   retrieve, during a first time period, a first copy of the first data stored in a first storage queue that is included in the plurality of different storage queues in the SCP memory system and that has a first priority;
   transmit, during the first time period, the first copy of the first data via at least one of the plurality of ports in the SCP communication system and through a network for storage on at least one first storage device;
   retrieve, during a second time period that is subsequent to the first time period, a second copy of the first data stored in a second storage queue that is included in the plurality of different storage queues in the SCP memory system and that has a second priority that is lower than the first priority; and
   transmit, during the second time period, the second copy of the first data via at least one of the plurality of ports in the SCP communication system and through the network for storage on at least one second storage device.

2. The system of claim 1, wherein SCP data storage subsystem is configured to:
  receive, from the central processing system, the first data;
  store the first copy of the first data on the first storage queue; and
  store the second copy of the first data on the second storage queue.

3. The system of claim 1, wherein SCP data storage subsystem is configured to:
  identify, in a storage target database, the at least one first storage device and the second storage device.

4. The system of claim 1, wherein SCP data storage subsystem is configured to:
  perform, between the first time period and the second time period and via the at least one of the plurality of ports in the SCP communication system, at least one second data transmission operation that involves second data and that does not involve the second copy of the first data.

5. The system of claim 4, wherein the at least one data transmission operation includes the transmission of the second data that has a priority that is higher than the second copy of the first data.

6. The system of claim 4, wherein SCP data storage subsystem is configured to:
  determine that the at least one of the plurality of ports is available following the data transmission operations; and
  transmit, in response to determining that the at least one of the plurality of ports is available following the data transmission operations and during the second time period, the second copy of the first data.

7. An Information Handling System (IHS), comprising:
  a System Control Processor (SCP) processing system; and
  an SCP memory system that is coupled to the SCP processing system, that includes a plurality of different storage queues that have different priorities and that are each configured to store a copy of first data provided by a central processing system that is separate from the SCP processing system, and that includes instructions that, when executed by the SCP processing system, cause the SCP processing system to provide a SCP data storage engine that is configured to:
    retrieve, during a first time period, a first copy of first data stored in a first storage queue that is included in the plurality of different storage queues in the SCP memory system and that has a first priority;
    transmit, during the first time period, the first copy of the first data via at least one of a plurality of ports in an SCP communication system and through a network for storage on at least one first storage device;
    retrieve, during a second time period that is subsequent to the first time period, a second copy of the first data stored in a second storage queue that is included in the plurality of different storage queues in the SCP memory system and that has a second priority that is lower than the first priority; and
    transmit, during the second time period, the second copy of the first data via at least one of the plurality of ports in the SCP communication system and through the network for storage on at least one second storage device.

8. The IHS of claim 7, wherein SCP data storage engine is configured to:
  receive, from the central processing system, the first data;
  store the first copy of the first data on the first storage queue; and
  store the second copy of the first data on the second storage queue.

9. The IHS of claim 7, wherein SCP data storage engine is configured to:
  identify, in a storage target database, the at least one first storage device and the second storage device.

10. The IHS of claim 7, wherein SCP data storage engine is configured to:
  perform, between the first time period and the second time period and via the at least one of the plurality of ports in the SCP communication system, at least one second data transmission operation that involves second data and that does not involve the second copy of the first data.

11. The IHS of claim 10, wherein the at least one data transmission operation includes the transmission of the second data that has a priority that is higher than the second copy of the first data.

12. The IHS of claim 10, wherein SCP data storage subsystem is configured to:
  determine that the at least one of the plurality of ports is available following the data transmission operations; and
  transmit, in response to determining that the at least one of the plurality of ports is available following the data transmission operations and during the second time period, the second copy of the first.

13. The IHS of claim 7, wherein the first storage queue is associated with a first Quality of Server (QoS) for data stored in the first storage queue, and wherein the second storage queue is associated with a second QoS for data stored in the second storage queue that is different than the first QoS.

14. A method for system control processor data mirroring, comprising:
  retrieving, by a System Control Processor (SCP) data storage subsystem during a first time period, a first copy of first data that was provided by a central processing system and stored in a first storage queue that is included in the plurality of different storage queues in an SCP memory system and that has a first priority;
  transmitting, by the SCP data storage subsystem during the first time period, the first copy of the first data via at least one of a plurality of ports in an SCP communication system and through a network for storage on at least one first storage device;
  retrieving, by the SCP data storage subsystem during a second time period that is subsequent to the first time period, a second copy of the first data that was provided by the central processing system and stored in a second storage queue that is included in the plurality of different storage queues in the SCP memory system and that has a second priority that is lower than the first priority; and
  transmitting, by the SCP data storage subsystem during the second time period, the second copy of the first data via at least one of the plurality of ports in the SCP communication system and through the network for storage on at least one second storage device.

15. The method of claim 14, further comprising:
  receiving, by the SCP data storage subsystem from the central processing system, the first data;
  storing, by the SCP data storage subsystem, the first copy of the first data on the first storage queue; and
  storing, by the SCP data storage subsystem, the second copy of the first data on the second storage queue.

16. The method of claim 14, further comprising:
identifying, by the SCP data storage subsystem in a storage target database, the at least one first storage device and the second storage device.

17. The method of claim 14, further comprising:
performing, by the SCP data storage subsystem between the first time period and the second time period and via the at least one of the plurality of ports in the SCP communication system, at least one second data transmission operation that involves second data and that does not involve the second copy of the first data.

18. The method of claim 17, wherein the at least one data transmission operation includes the transmission of the second data that has a priority that is higher than the second copy of the first data.

19. The method of claim 17, further comprising:
determining, by the SCP data storage subsystem, that the at least one of the plurality of ports is available following the data transmission operations; and
transmitting, by the SCP data storage subsystem in response to determining that the at least one of the plurality of ports is available following the data transmission operations and during the second time period, the second copy of the first.

20. The method of claim 14, wherein the first storage queue is associated with a first Quality of Server (QoS) for data stored in the first storage queue, and wherein the second storage queue is associated with a second QoS for data stored in the second storage queue that is different than the first QoS.

* * * * *

UNITED STATES PATENT AND TRADEMARK OFFICE
CERTIFICATE OF CORRECTION

| | |
|---|---|
| PATENT NO. | : 11,726,882 B2 |
| APPLICATION NO. | : 17/492761 |
| DATED | : August 15, 2023 |
| INVENTOR(S) | : Butcher et al. |

It is certified that error appears in the above-identified patent and that said Letters Patent is hereby corrected as shown below:

In the Specification

Figure 10C:
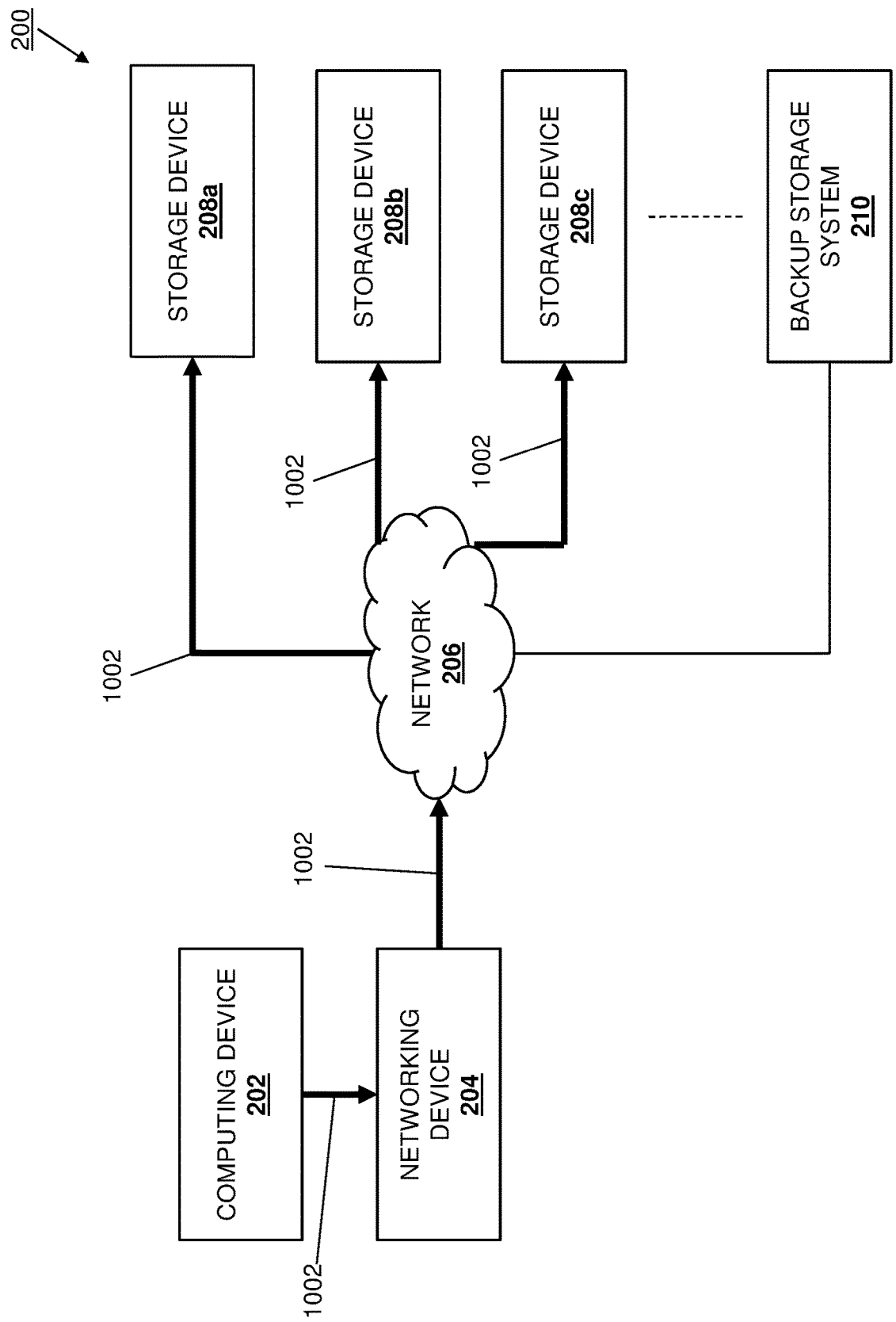

Column 2, Line 59, "FIG. 100" should read --FIG. 10C--

Column 5, Line 15, "may be provided as Oct. 4, 2021" should be changed to --may be provided as described in U.S. patent application Ser. No. 17/492,731, filed on Oct. 4, 2021--

Signed and Sealed this
Thirty-first Day of October, 2023

*Katherine Kelly Vidal*

Katherine Kelly Vidal
*Director of the United States Patent and Trademark Office*